United States Patent [19]
Lin et al.

[11] Patent Number: 5,835,782
[45] Date of Patent: Nov. 10, 1998

[54] PACKED/ADD AND PACKED SUBTRACT OPERATIONS

[75] Inventors: Derrick Chu Lin, Foster City; Mehrdad Mohebbi, San Jose, both of Calif.

[73] Assignee: Intel Corporation, Santa Clara, Calif.

[21] Appl. No.: 611,123

[22] Filed: Mar. 4, 1996

[51] Int. Cl.$^6$ .............................. G06F 7/50; G06F 13/40; G11C 11/14

[52] U.S. Cl. ............................. 395/800.42; 364/736.01; 395/800.36; 395/306

[58] Field of Search ..................... 395/800, 733, 395/309, 401, 510, 595, 849, 832, 872, 74, 306, 871, 800.3; 364/DIG. 1, DIG. 2, 936.5, 721, 736, 784, 738, 741, 786, 768, 716.07, 736.01, 914; 371/43; 341/51

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 3,986,015 | 10/1976 | Gooding et al. | 364/738 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 375/52 |
| 4,707,800 | 11/1987 | Montrone et al. | 364/788 |
| 4,737,926 | 4/1988 | Vo et al. | 364/787 |
| 4,768,160 | 8/1988 | Yokoyama | 364/745 |
| 4,771,379 | 9/1988 | Ando et al. | 364/200 |
| 4,821,225 | 4/1989 | Ando et al. | 364/736.5 |
| 4,888,719 | 12/1989 | Yassa | 364/721 |
| 4,905,180 | 2/1990 | Kumar | 364/787 |
| 4,914,617 | 4/1990 | Putrino et al. | 364/786 |
| 4,989,168 | 1/1991 | Kuroda et al. | 364/715.09 |
| 5,047,975 | 9/1991 | Patti et al. | 364/786 |
| 5,095,457 | 3/1992 | Jeong | 364/758 |
| 5,187,679 | 2/1993 | Vassiliadis et al. | 364/786 |
| 5,189,635 | 2/1993 | Ohki | 364/784 |
| 5,189,636 | 2/1993 | Patti et al. | 364/786 |
| 5,311,177 | 5/1994 | Kimura et al. | 341/51 |
| 5,327,369 | 7/1994 | Ashkenazi | 364/787 |

OTHER PUBLICATIONS

"Philips Hopes to Displace DSPs with VLIW", B, Case, 1994.
"TMS320C2X User's Guide", pp. 3–2—3–34; 4–1—4–151, Texas Instruments, 1993.
"New PA–RISC Processor Decodes MPEG Video", pp. 16–17, L. Gwennap, Jan. 1994.
"SPARC Technology Business", Sun Microsystems, 1994.
"A Single Chip Digital Processor for Voiceband", Y. Kawakami, pp. 40–41 1980.
"Graphics Processing with 88110 Second Generation RISC", pp. 169–174, J. Shipnes, 1992.
"MC88110 Second Generation RISC . . . ", Motorola Inc. 1991.
"Errata to MC88110 . . . ", pp. 1–11, Motorola Inc. 1992.
"MC88110 Programmer's Reference Guide ", pp. 1–5, Motorola Inc. 1992.
"i860 Microporcessor Family Programmer's Ref. Manual", Ch. 1, 3, 8, 12, Intel Corp. 1992.

(List continued on next page.)

*Primary Examiner*—Daniel H. Pan
*Attorney, Agent, or Firm*—Blakely, Sokoloff, Taylor & Zafman

[57] ABSTRACT

A processor having a circuit for performing a packed addition and/or packed subtraction operation. The decoder accesses the registers addressed by SRC1 and SRC2. These registers provide a first packed data and a second packed data to the circuit. Packed data consists of a number of fixed length data elements. The data elements can be eight bits, sixteen bits or thirty-two bits in length. The circuit performs the operation on the first data element from the first packed data and the first data element from second packed data, producing a first result data element. The circuit performs this operation on the next data element from the first packed data and the next data element from the second packed data, producing a next result data element. This continues for all the data elements in the first and second packed data. The result data elements constitute a result packed data that is stored in the destination register.

12 Claims, 23 Drawing Sheets

OTHER PUBLICATIONS

"Accelerating Multimedia with Enhanced Microprocessors", Lee, 1995.

"Pentium Processorsr User's Manual, vol. 3: Arch. & Prog . . . ", Ch 1, 3, 4, 6, 8, 18, Intel 1993.

"i860 Microprocessor Architecture", Ch. 6, 7, 8, 10, 11, Margulis, 1990.

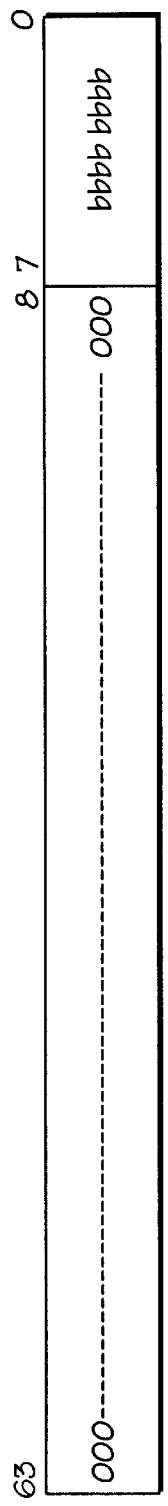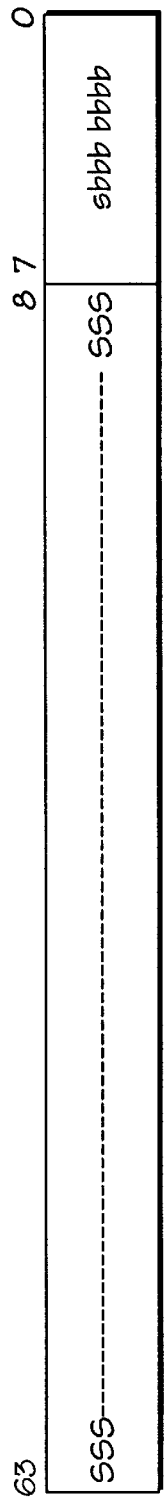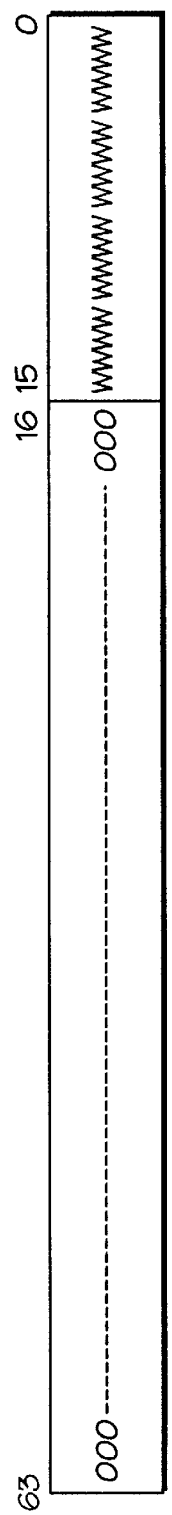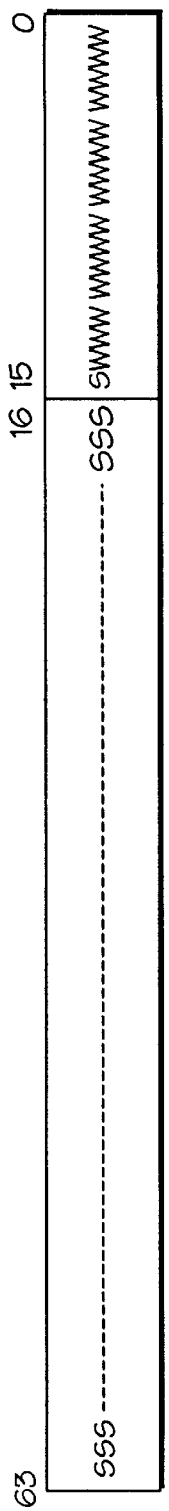
FIG. 4b
FIG. 4c
410 Unsigned Byte
411 Signed Byte
412 Unsigned Word
413 Signed Word

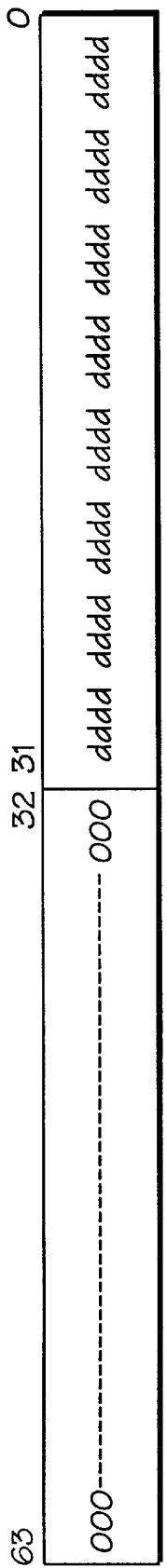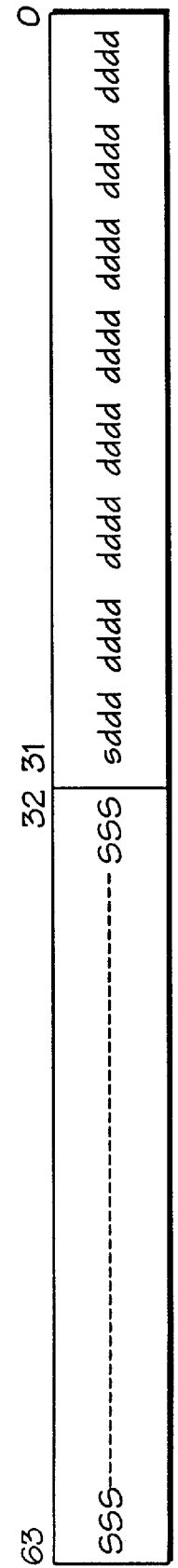
FIG. 4d

501 PACKED BYTE DATA TYPE.

| 63 | 56 55 | 48 47 | 40 39 | 32 31 | 24 23 | 16 15 | 8 7 | 0 |
|---|---|---|---|---|---|---|---|---|
| | byte 7 | byte 6 | byte 5 | byte 4 | byte 3 | byte 2 | byte 1 | byte 0 |

502 PACKED WORD DATA TYPE.

| 63 | 48 47 | 32 31 | 16 15 | 0 |
|---|---|---|---|---|
| | word 3 | word 2 | word 1 | word 0 |

503 PACKED DOUBLEWORD DATA TYPE.

| 63 | 32 31 | 0 |
|---|---|---|
| | doubleword 1 | doubleword 0 |

FIG. 5a

| 63 | 55 54 | 47 46 | 39 38 | 31 30 | 30 22 | 15 14 | 7 6 | 0 |
|---|---|---|---|---|---|---|---|---|
| bbbb bbbb | bbbb bbbb | bbbb bbbb | bbbb bbbb | bbbb bbbb | bbbb bbbb | bbbb bbbb | bbbb bbbb | |
| byte 7 | byte 6 | byte 5 | byte 4 | byte 3 | byte 2 | byte 1 | byte 0 | |

510 Unsigned Packed Byte In-Register Representation

| 63 | 55 54 | 47 46 | 39 38 | 31 30 | 30 22 | 15 14 | 7 6 | 0 |
|---|---|---|---|---|---|---|---|---|
| sbbb bbbb | sbbb bbbb | sbbb bbbb | sbbb bbbb | sbbb bbbb | sbbb bbbb | sbbb bbbb | sbbb bbbb | |
| byte 7 | byte 6 | byte 5 | byte 4 | byte 3 | byte 2 | byte 1 | byte 0 | |

511 Signed Packed Byte In-Register Representation

FIG. 5b

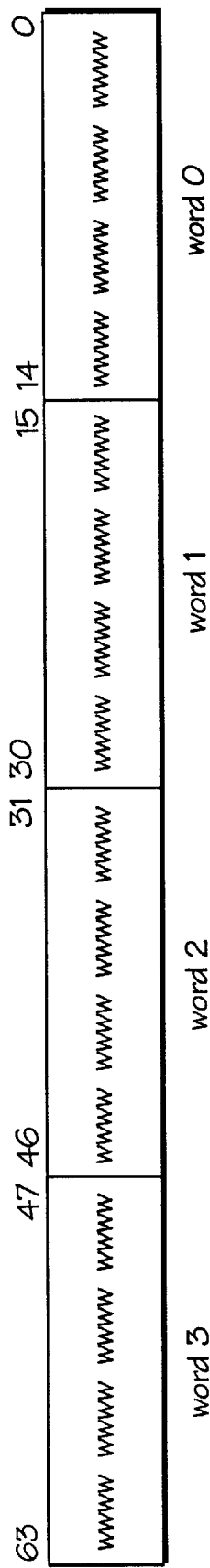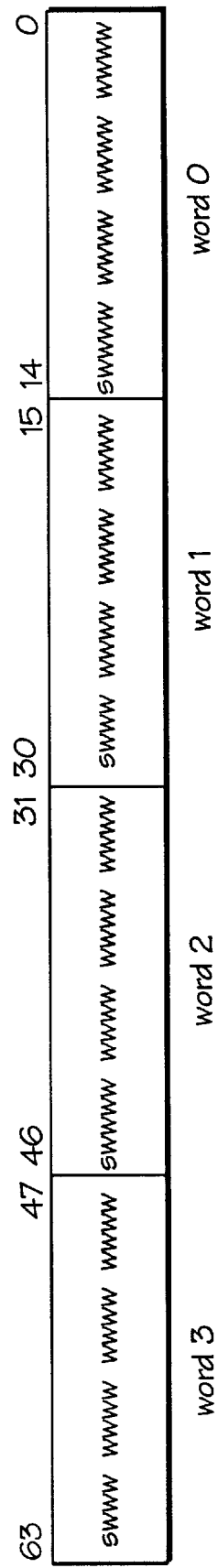
FIG. 5c

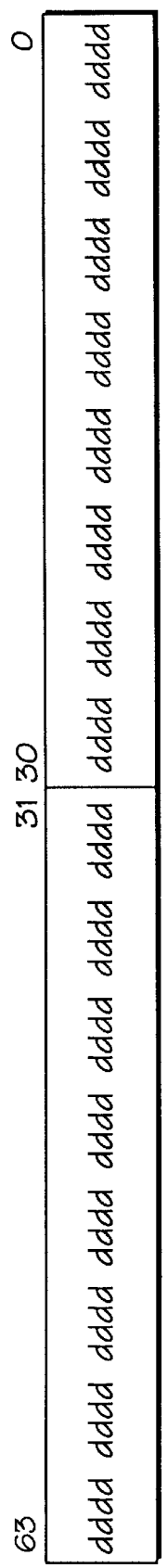
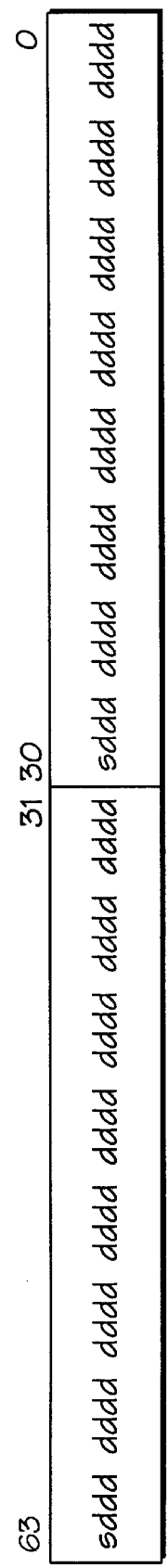
FIG. 5d

PACKED/ADD AND PACKED SUBTRACT OPERATIONS

BACKGROUND OF THE INVENTION

1. Field of the Invention

The present invention relates to the field of processor operation. In particular, the present invention describes arithmetic operations using a control signal to manipulate multiple data elements. The present invention allows execution of addition and subtraction operations on packed data types.

2. Description of Related Art

Today, most personal computer systems operate with one instruction to produce one result. Performance increases are achieved by increasing execution speed of instructions and the processor instruction complexity; known as Complex Instruction Set Computer (CISC). Such processors as the Intel 80286™ microprocessor, available from Intel Corp. of Santa Clara, Calif., belong to the CISC category of processor.

Previous computer system architecture has been optimized to take advantage of the CISC concept. Such systems typically have data buses thirty-two bits wide. However, applications targeted at computer supported conferencing (CSC—the integration of teleconferencing with mixed media data manipulation), 2D/3D graphics, image processing, video compression/decompression, recognition algorithms and audio manipulation increase the need for improved performance. But, increasing the execution speed and complexity of instructions is only one solution.

One common aspect of these applications is that they often manipulate large amounts of data where only a few bits are important. That is, data whose relevant bits are represented in much fewer bits than the size of the data bus. For example, processors execute many operations on eight bit and sixteen bit data (e.g., pixel color components in a video image) but have much wider data busses and registers. Thus, a processor having a thirty-two bit data bus and registers, and executing one of these algorithms, can waste up to seventy-five percent of its data processing, carrying and storage capacity because only the first eight bits of data are important.

As such, what is desired is a processor that increases performance by more efficiently using the difference between the number of bits required to represent the data to be manipulated and the actual data carrying and storage capacity of the processor.

SUMMARY OF THE INVENTION

A microprocessor for performing packed arithmetic operations on two packed data. The apparatus includes a first bus coupled to portions of first inputs of an adder that correspond to the smallest values representable by the packed data. The apparatus includes a second bus coupled to portions of second inputs of the adder that correspond to the smallest values representable by the packed data. The apparatus also includes at least one mux coupled to at least one portion between portions of first inputs and at least one mux coupled to at least one portion between portions of second inputs. Each of the muxes control whether a carry is input to the higher order adjacent value. A packed result of said packed arithmetic operation is indicated on a portion of said plurality of outputs representing multiple values.

BRIEF DESCRIPTION OF THE DRAWINGS

FIG. 4b through FIG. 4d illustrate in-register integer data representations.

FIG. 5a illustrates packed data-types.

FIG. 5b through FIG. 5d illustrate in-register packed data representations.

DETAILED DESCRIPTION

DEFINITIONS

To provide a foundation for understanding the description of the embodiments of the present invention, the following definitions are provided.

Bit X through Bit Y:
  defines a subfield of binary number. For example, bit six through bit zero of the byte 001 11010$_2$ (shown in base two) represent the subfield 111010$_2$. The '$_2$' following a binary number indicates base 2. Therefore, 1000$_2$ equals 8$_{10}$, while F$_{16}$ equals 15$_{10}$.

R$_x$: is a register. A register is any device capable of storing and providing data. Further functionality of a register is described below.

DEST: is an address of a register.

SRC1: is an address of a register.

SRC2: is an address of a register.

Result: is the data to be stored in the register addressed by DEST.

Source1: is the data stored in the register addressed by SRC1.

Source2: is the data stored in the register addressed by SRC2.

COMPUTER SYSTEM

An apparatus and method of increasing processor performance by efficiently reducing the difference between data element length and actual carrying and storage capacity is described. In the following description, numerous specific details are set forth such as packed data formats, control signal formats, etc., in order to provide a thorough understanding of the present invention. It will be obvious, however, to one skilled in the art that the present invention may be practiced without these specific details. In other instances, well-known processor architecture, circuits, structures and techniques have not been shown in detail in order not to unnecessarily obscure the present invention.

Figure 1:
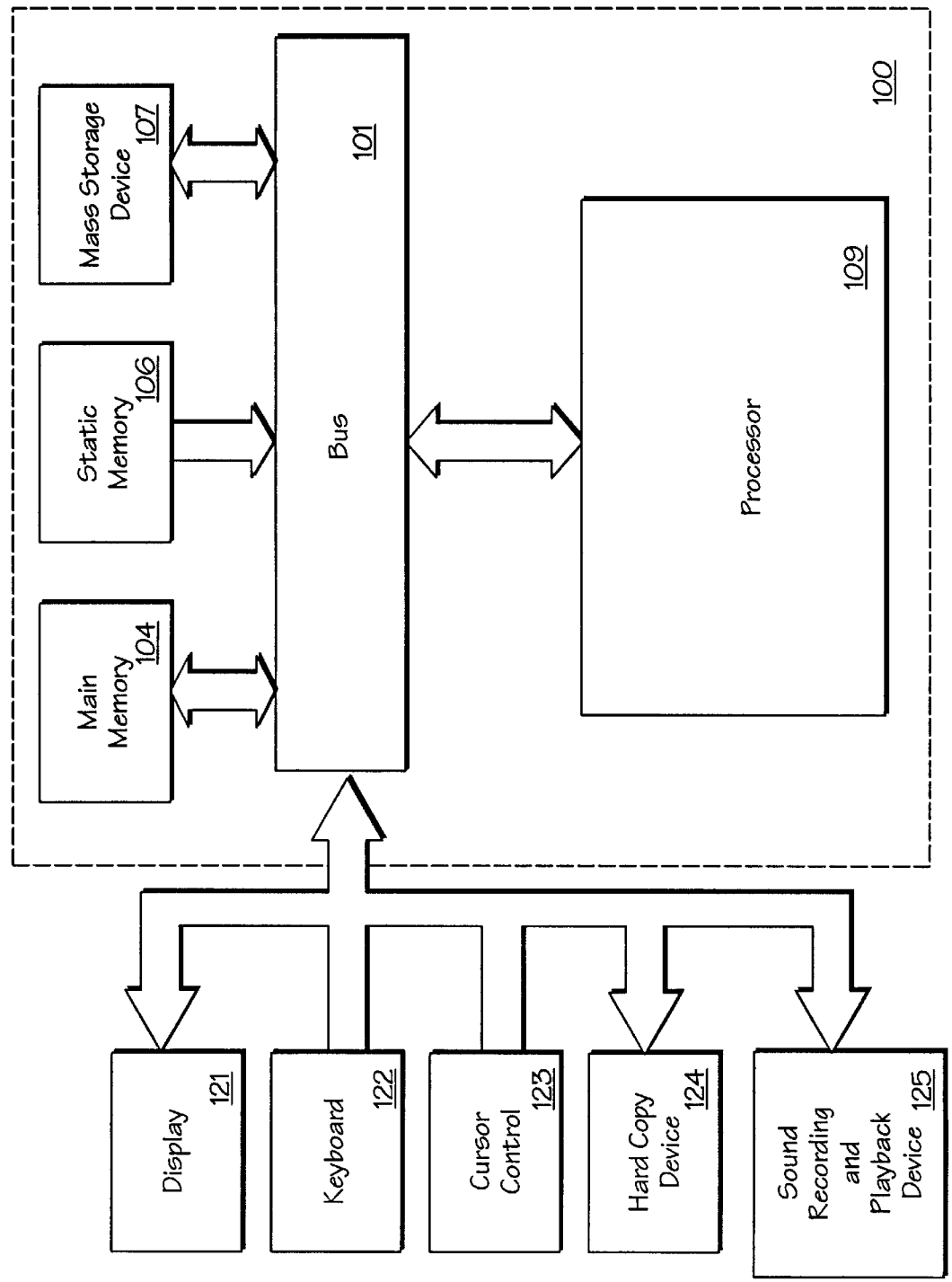
FIG. 1 illustrates an embodiment of the computer system capable of implementing the present invention.

FIG. 1 illustrates a computer system 100 upon which one embodiment of the present invention can be implemented. Computer system 100 comprises a bus or other communication means 101 for communicating information, and a processing means 109 coupled with bus 101 for processing information. System 100 further comprises a random access memory (RAM) or other dynamic storage device 104 (referred to as main memory), coupled to bus 101 for storing information and instructions to be executed by processor 109. Main memory 104 also may be used for storing temporary variables or other intermediate information during execution of instructions by processor 109. Computer system 100 also comprises a read only memory (ROM) and/or other static storage device 106 coupled to bus 101 for storing static data and instructions for processor 109. Data storage device 107 is coupled to bus 101 for storing information and instructions. Memory includes any data storage medium, such as main memory 104, cache memory, registers, ROM, and other static storage devices.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 109. Another type of user input device is cursor control 123, such as a mouse, a trackball, or cursor direction keys for communicating direction information and command selections to processor 109 and for controlling cursor movement on display 121. This input device typically has two degrees of freedom in two axes, a first axis (e.g., x) and a second axis (e.g., y), which allows the device to specify positions in a plane.

Another device that may be coupled to bus 101 is hard copy device 124 that may be used for printing instructions, data, or other information on a medium such as paper, film, or similar types of media. Additionally, computer system 100 can be coupled to a device for sound recording and/or playback 125 such as an audio digitizer coupled to a microphone for recording information. Further, the device may include a speaker that is coupled to a digital to analog (D/A) converter for playing back the digitized sounds. Finally, computer system 100 can be a terminal in a computer network (e.g., a LAN).

Computer system 100 is useful for supporting computer supported conferencing (CSC—the integration of teleconferencing with mixed media data manipulation), 2D/3D graphics, image processing, video compression/decompression, recognition algorithms and audio manipulation.

PROCESSOR

Figure 2:
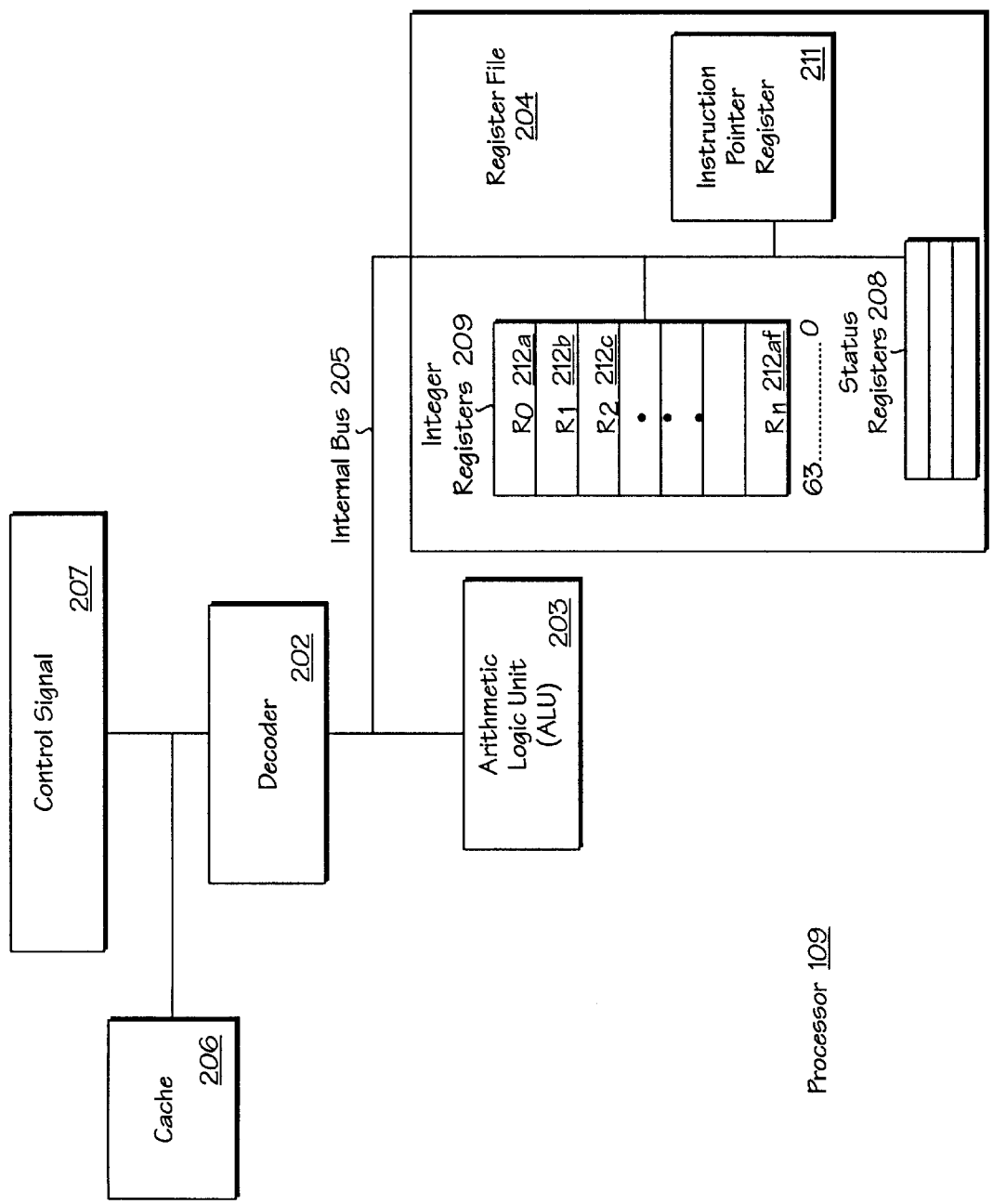
FIG. 2 illustrates an embodiment of the processor of the present invention.

FIG. 2 illustrates a detailed diagram of processor 109. One skilled in the art would understand that processor 109 could be implemented on one or more substrates using any of a number of process technologies, such as, BiCMOS, CMOS, and NMOS.

Processor 109 comprises a decoder 202 for decoding control signals and data used by processor 109. Data can then be stored in register file 204 via internal bus 205. As a matter of clarity, register file 204 should not be limited in meaning to a particular type of circuit. Rather, register file 204 need only be capable of storing and providing data, and performing the functions described herein.

Depending on the type of data, the data may be stored in integer registers 209, status registers 208, or instruction pointer register 211. Integer registers 209 contains thirty-two integer registers, $R_0$ 212a through $R_n$ 212af. Each register is sixty-four bits in length. $R_0$ 212a, $R_1$ 212b and $R_2$ 212c are examples of individual registers in integer registers 209. Status registers 208 indicate the status of processor 109. Instruction pointer 211 stores the address of the next instruction to be executed. Integer registers 209, status registers 208, and instruction pointer register 211 all connect to internal bus 205.

Arithmetic logic unit 203 (ALU) performs the arithmetic and logic operations carried out by processor 109. Such operations may include logical shifts, addition, subtraction and multiplication, etc. ALU 203 connects to internal bus 205. Cache 206 is an optional element of processor 109 and can be used to cache data, including control signals, from, for example, main memory 104. Cache 206 is connected to decoder 202, and is connected to receive control signal 207.

Figure 3:
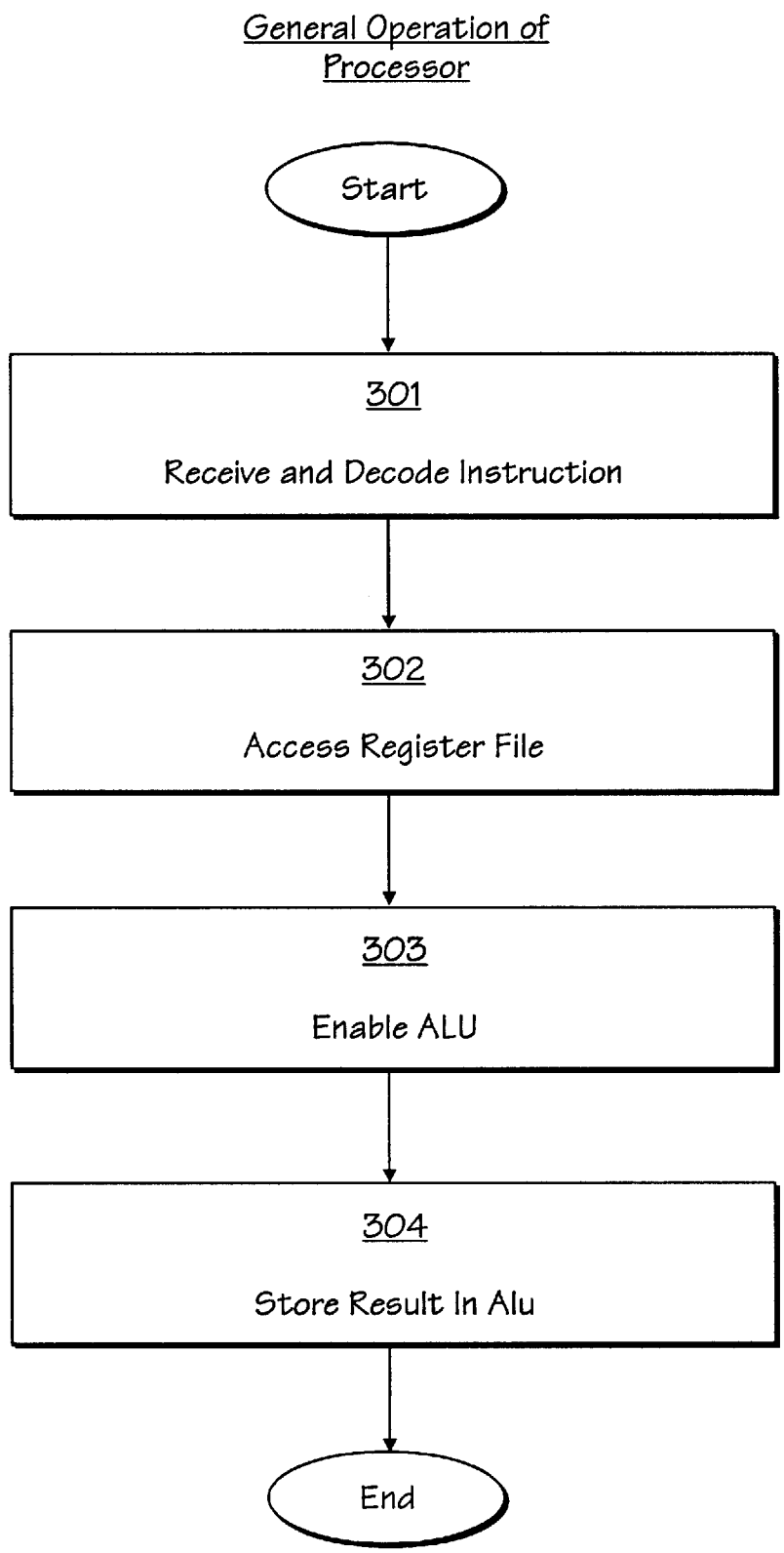
FIG. 3 is a flow diagram illustrating the general steps used by the processor to manipulate data in the register file.

FIG. 3 illustrates the general operation of processor 109. That is, FIG. 3 illustrates the steps followed by processor 109 while performing an operation on packed data, performing an operation on unpacked data, or performing some other operation. For example, such operations include a load operation to load a register in register file 204 with data from cache 206, main memory 104, static memory 106, or mass storage device 107. In one embodiment of the present invention, processor 109 supports most of the instructions supported by the Intel 80486™, available from Intel Corporation of Santa Clara, Calif. In another embodiment of the present invention, processor 109 supports all the operations supported by the Intel 80486™, available from Intel Corporation of Santa Clara, Calif. In another embodiment of the present invention, processor 109 supports all the operations supported by the Pentium™, the Intel 80486™, the 80386™, the Intel 80286™, and the Intel 8086™, all available from Intel Corporation of Santa Clara, Calif. In another embodiment of the present invention, processor 109 supports all the operations supported in the X86 Architecture™ as defined by Intel Corporation of Santa Clara, Calif. (see *Microprocessors,* Intel Data Books volume 1 and volume 2, 1992 and 1993, available from Intel of Santa Clara, Calif.).

At block 301, the decoder 202 receives a control signal 207 from either the cache 206 or bus 101. Decoder 202 decodes the control signal to determine the operations to be performed.

Decoder 202 accesses the register file 204, or a location in another memory, at block 302. Registers in the register file 204, or memory locations in another memory, are accessed depending on the address specified in the control signal 207. For example, for an operation on packed data, control signal 207 includes SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. SRC1, SRC2 and DEST are described more fully in relation to FIG. 6. The data stored in these registers is referred to as Source1, Source2, and Result respectively. Each of these data is sixty-four bits in length.

In another embodiment of the present invention, any one, or all, of SRC1, SRC2 and DEST, can define a memory location in the addressable memory space of processor 109. For example, SRC1 may identify a memory location in main memory 104 while SRC2 identifies a first register in integer registers 201, and DEST identifies a second register in registers 209. For simplicity of the description herein, references are made to the accesses to the register file 204, however, these accesses could be made to another memory instead.

In another embodiment of the present invention, the operation code only includes two addresses, SRC1 and SRC2. In this embodiment, the result of the operation is stored in the SRC1 or SRC2 register. That is SRC1 (or SRC2) is used as the DEST. This type of addressing is compatible with previous CISC instructions having only two addresses. This reduces the complexity in the decoder 202. Note, in this embodiment, if the data contained in the SRC1 register is not to be destroyed, then that data is copied into another register before the execution of the operation. The copying would require an additional instruction. To simplify the description herein, the three address addressing scheme will be described (i.e. SRC1, SRC2, and DEST). However, it should be remembered that the control signal, in one embodiment, may only include SRC1 and SRC2, and that SRC1 (or SRC2) identifies the destination register.

Where the control signal requires an arithmetic or logic operation, at step 303, ALU 203 will be enabled to perform this operation on accessed data from register file 204. Once the arithmetic or logic operation has been performed in ALU 203, at step 304, the result is stored back into register file 204 according to requirements of control signal 207.

DATA AND STORAGE FORMATS

Figure 4A:
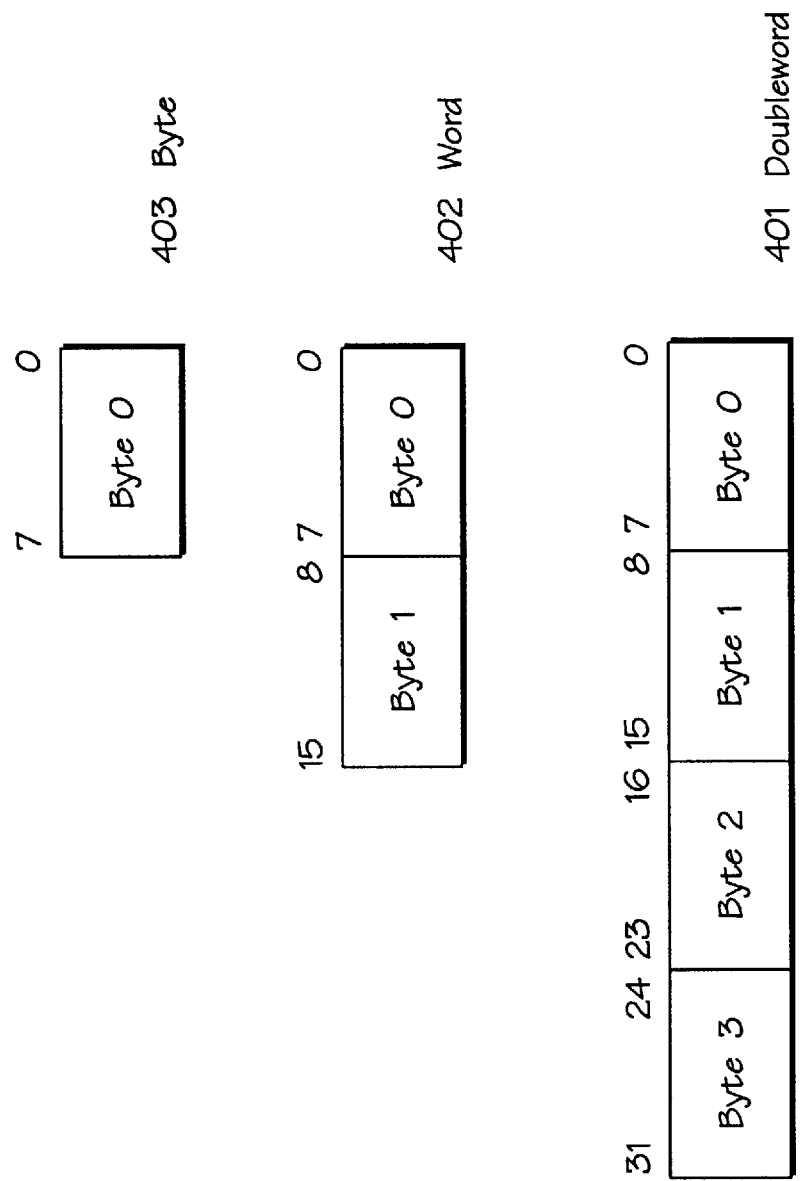
FIG. 4a illustrates memory data types.

FIG. 4a illustrates some of the data formats as may be used in the computer system of FIG. 1. Processor 109 can manipulate these data formats. Multimedia algorithms often use these data formats. A byte 401 contains eight bits of information. A word 402 contains sixteen bits of information, or two bytes. A doubleword 403 contains thirty-two bits of information, or four bytes. Thus, processor 109 executes control signals that may operate on any one of these memory data formats.

In the following description, references to bit, byte, word, and doubleword subfields are made. For example, bit six through bit zero of the byte $00111010_2$ (shown in base 2) represent the subfield $111010_2$.

FIG. 4b through FIG. 4d illustrate in-register integer data representations used in one embodiment of the present invention. For example, unsigned byte 410 can represent data stored in integer register $R_1$ 212a. A register, in integer registers 209, is sixty-four bits in length.

In-register unsigned byte representation 410 illustrates processor 109 storing a byte 401 in integer registers 209. The first eight bits, bit seven through bit zero, in that integer register are dedicated to the data byte 401. These bits are shown as {b }. To properly represent this byte, the remaining 56 bits must be zero.. For a signed byte 411, integer registers 209 store the data in the first seven bits, bit six through bit zero, to be data. The seventh bit represents the sign bit, shown as an {s}. The remaining bit sixty-three through bit eight are the continuation of the sign for the byte.

Unsigned word in-register data representation 412 is stored in one register of integer registers 209. Bit fifteen through bit zero contain the unsigned word 402. These bits are shown as {w}. To properly represent this word, the remaining bit sixty-three through bit sixteen must be zero. Signed word 402 is stored in bit fourteen through bit zero as shown in the signed word in-register data representation 413. The remaining bit sixty-three through bit fifteen is the sign field.

A doubleword 403 can be stored as an unsigned doubleword or a signed doubled word 414 or 415. Bit thirty-one through bit zero of an unsigned doubleword 414 are the data. These bits are shown as {d}. To properly represent this unsigned doubleword, the remaining bit sixty-three through bit thirty-two must be zero. Integer register 209 stores a signed doubleword 415 in its bit thirty through bit zero; the remaining bit sixty-three through bit thirty-one are the sign field.

As indicated by the above FIG. 4b through FIG. 4d, storage of some data types in a sixty-four bit wide register is an inefficient method of storage. For example, for storage of a byte in-register data representation 410 bit sixty-three through bit eight must be zero, while only bit seven through bit zero may contain non-zero bits. Thus, a processor storing a byte in an integer register uses only 12.5% of its capacity. Similarly, only the first few bits of operations performed by ALU 203 will be important.

FIG. 5a illustrates the data formats for packed data. Three packed data formats are illustrated; packed byte 501, packed word 502, and packed doubleword 503. Packed byte 501, in the preferred embodiment of the present invention, is sixty-four bits long containing eight data elements. Each data element is one byte long. Generally, a data element is an individual piece of data that is stored in a single integer register with other data elements of the same length. In the preferred embodiment of the present invention, the number of data elements stored in an integer register is sixty-four bits divided by the length in bits of a data element.

Packed word data 502 is sixty-four bits long and contains four word data elements 402. Each word data element 402 contains sixteen bits of information.

Packed doubleword data 503 is sixty-four bits long and contains two doubleword 403 data elements. Each doubleword data element 403 contains thirty-two bits of information.

FIG. 5b through FIG. 5d illustrate the in-register packed data storage representation. Unsigned packed byte in-register representation 510 illustrates the storage of packed data type 501 in one of the integer registers $R_0$ 212a through $R_n$ 212af. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the integer register. This storage arrangement increases the storage efficiency of the processor. As well, with eight data elements accessed, one operation can now be performed on eight data elements simultaneously. Signed packed byte in-register representation 511 is similarly stored in an integer register in integer registers 209. Note that only the eighth bit of every byte data element is the sign bit; no other bits are used to indicate sign.

Unsigned packed word in-register representation 512 illustrates how word three through word zero are stored in one integer register of integer registers 209. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that only the sixteenth bit of each word data element contains the sign indicator.

Unsigned packed doubleword in-register representation 514 shows how integer registers 209 store two doubleword data elements. Doubleword zero is stored in bit thirty-one through bit zero of the integer register. Doubleword one is stored in bit sixty-three through bit thirty-two of the integer register. Signed packed doubleword in-register representation 515 is similar to unsigned packed doubleword in-register representation 514. Note that the signed bit is the thirty-second bit of the doubleword data element.

In one embodiment of the present invention, the individual programming processor 109 must track whether an addressed register, $R_1$ 212a for example, is storing packed data or simple integer data. One skilled in the art would understand that in an alternative embodiment, processor 109 could track the type of data stored in individual registers of integer registers 209. This alternative embodiment could then generate errors if, for example, a packed addition operation were attempted on simple integer data.

CONTROL SIGNAL FORMATS

The following describes the control signal formats used by processor 109 to manipulate packed data. In one embodiment of the present invention, control signals are represented as thiry-two bits. Decoder 202 may receive control signal 207 from bus 101. However, it is obvious to one skilled in the art that decoder 202 can also receive such control signals from cache 206.

Figure 6:
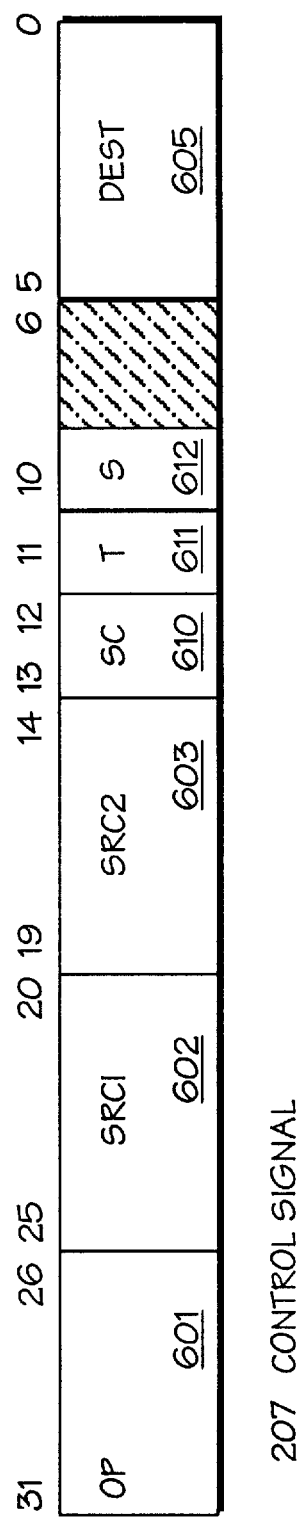
FIG. 6 illustrates the control signal format used in the computer system to indicate the use of packed data.

FIG. 6 illustrates the general format for a control signal operating on packed data. Operation field OP 601, bit thirty-one through bit twenty-six, provides information about the operation to be performed by processor 109; for example, packed addition, packed subtraction, etc.. SRC1 602, bit twenty-five through twenty, provides the source register address of a register in integer registers 209. This source register contains the first packed data, Source1, to be used in the execution of the control signal. Similarly, SRC2 603, bit nineteen through bit fourteen, contains the address of a register in integer registers 209. This second source register contains the packed data, Source2, to be used during execution of the operation. DEST 605, bit five through bit zero, contains the address of a register in integer registers 209. This destination register will store the result packed data, Result, of the packed data operation. Although this general format for a control signal uses source and destination registers in integer registers 209, one skilled in the art would understand that an alternative embodiment can use the source and destination addresses of memory locations in cache 206 or main memory 104.

Control bits SZ 610, bit twelve and bit thirteen, indicates the length of the data elements in the first and second packed data source registers. If SZ 610 equals $01_2$, then the packed data is formatted as packed byte data type 501. If SZ 610 equals $10_2$, then the packed data is formatted as packed word data type 502. SZ 610 equaling $00_2$ or $11_2$ is reserved, however, given the above description, one of ordinary skill in the art would understand that one of these values could be used for packed doubleword size data type 503.

Control bit T 611, bit eleven, indicates whether the operation is to be carried out with saturate mode. If T 611 equals one, then a saturating operation is performed. If T 611 equals zero, then a nonsaturating operation is performed. Saturating operations will be described later.

Control bit S 612, bit ten, indicates the use of a signed operation. If S 612 equals one, then a signed operation is performed. If S 612 equals zero, then an unsigned operation is performed.

DESCRIPTION OF SATURATE/UNSATURATE

As mentioned previously, T 611 indicates whether operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 1.

TABLE 1

| Data Format | Minimum Value | Maximum Value |
| --- | --- | --- |
| Unsigned Byte | 0 | 255 |
| Signed Byte | −128 | 127 |
| Unsigned Word | 0 | 65535 |
| Signed Word | −32768 | 32767 |
| UnSigned Doubleword | 0 | $2^{64}-1$ |
| Signed Doubleword | $-2^{63}$ | $2^{63}-1$ |

As mentioned above, T 611 indicates whether saturating operations are being performed. Therefore, using the unsigned byte data format, if an operation's result=258 and saturation was enabled, then the result would be clamped to 255 before being stored into the operation's destination register. Similarly, if an operation's result=−32999 and processor 209 used signed word data format with saturation enabled, then the result would be clamped to −32768 before being stored into the operation's destination register.

PACKED DATA ARITHMETIC

The preferred embodiment of the present invention increases the performance of multimedia algorithms by supporting packed data arithmetic operations in addition to unpacked data arithmetic operations. In particular, it has been found that packed addition and subtraction increase the performance of these algorithms significantly. Packed data operations execute independently on all eight (packed bytes), four (packed words), or, in an alternative embodiment, two (packed doublewords) data elements.

PACKED ADDITION

Figure 7A:
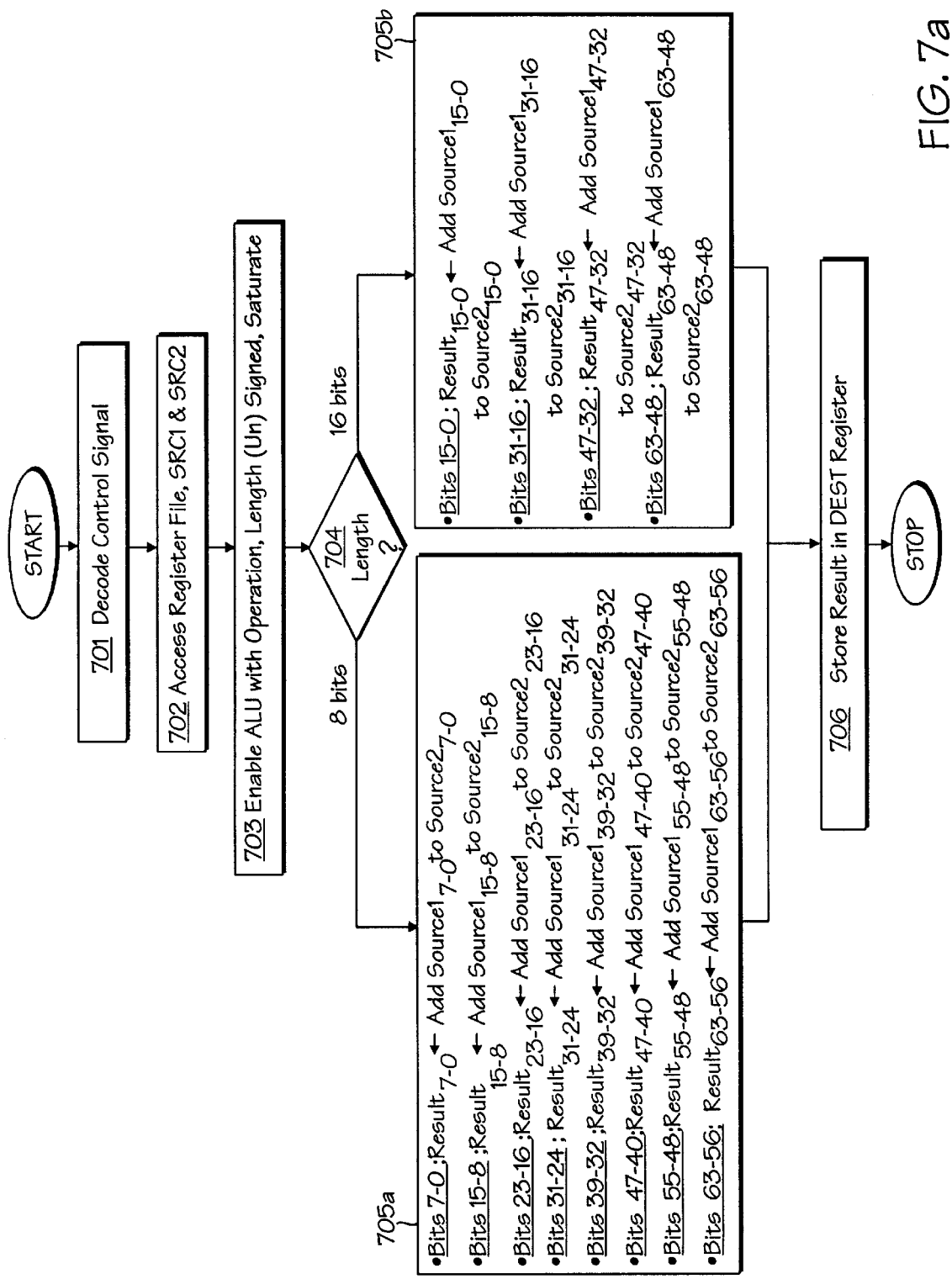
FIG. 7a illustrates the steps followed by the processor when adding packed data to packed data.

The preferred embodiment of the present invention enables packed addition operations to be performed in ALU 203. That is, the present invention enables each data element of a first packed data to be added individually to each data element of a second packed data. FIG. 7a illustrates one method of performing a packed addition in the present invention. At step 701, decoder 202 decodes control signal 207 received by processor 109. Thus, decoder 202 decodes: the operation code for packed addition; SRC1 602, SRC2 603 and DEST 605 addresses in integer registers 209; saturate/unsaturate, signed/unsigned, and length of the data elements in the packed data. At step 702, via internal bus 205, decoder 202 accesses integer registers 209 in register file 204 given the SRC1 602 and SRC2 603 addresses. Integer registers 209 provides ALU 203 with the packed data stored in the registers at these addresses, Source1 and Source2 respectively. That is, integer registers 209 communicate the packed data to ALU 203 via internal bus 205.

At step 703, decoder 202 enables ALU 203 to perform a packed addition operation. Decoder 202 further communicates, via internal bus 205, the length of packed data elements, whether saturation is to be used, and whether signed arithmetic is to be used. At step 704, the length of the data element determines which step is to be executed next. If the length of the data elements in the packed data is eight bits (byte data), then ALU 203 performs step 705a. However, if the length of the data elements in the packed data is sixteen bits (word data), then ALU 203 performs step 705b. In the present embodiment of the invention, only eight bit and sixteen bit data element length packed addition is supported. However, in alternative embodiments of the present invention, thirty-two bit data element length packed addition is also supported.

Assuming the length of the data elements is eight bits, then step 705a is executed. ALU 203 adds bit seven through bit zero of Source1 to bit seven through bit zero of SRC2, producing bit seven through bit zero of Result packed data. In parallel with this addition, ALU 203 adds bit fifteen through bit eight of Source1 to bit fifteen through bit eight of Source2, producing bit fifteen through bit eight of Result packed data. In parallel with these additions, ALU 203 adds bit twenty-three through bit sixteen of Source1 to bit twenty-three through bit sixteen of Source2, producing bit twenty-three through bit sixteen of Result packed data. In parallel with these additions, ALU 203 adds bit thirty-one through bit twenty-four of Source1 to bit thirty-one through bit twenty-four of Source2, producing bit thirty-one through bit twenty-four of Result packed data. In parallel with these additions, ALU 203 adds bit thirty-nine through bit thirty-two of Source1 to bit thirty-nine through bit thirty-two of Source2, producing bit thirty-nine through bit thirty-two of Result packed data. In parallel with these additions, ALU 203 adds bit forty-seven through bit forty of Source1 to bit forty-seven through bit forty of Source2, producing bit forty-seven through bit forty of Result packed data. In parallel with these additions, ALU 203 adds bit fifty-five through bit forty-eight of Source1 to bit fifty-five through bit forty-eight of Source2, producing bit fifty-five through bit forty-eight of Result packed data. In parallel with these additions, ALU 203 adds bit sixty-three through bit fifty-six of Source1 to bit sixty-three through bit fifty-six of Source2, producing bit sixty-three through bit fifty-six of Result packed data.

Assuming the length of the data elements is sixteen bits, then step 705b is executed. ALU 203 adds bit fifteen through bit zero of Source1 to bit fifteen through bit zero of SRC2, producing bit fifteen through bit zero of Result packed data. In parallel with this addition, ALU 203 adds bit thirty-one through bit sixteen of Source1 to bit thirty-one through bit sixteen of Source2, producing bit thirty-one through bit sixteen of Result packed data. In parallel with these additions, ALU 203 adds bit forty-seven through bit thirty-two of Source1 to bit forty-seven through bit thirty-two of Source2, producing bit forty-seven through bit thirty-two of Result packed data. In parallel with these additions, ALU 203 adds bit sixty-three through bit forty-eight of Source1 to bit sixty-three through bit forty-eight of Source2, producing bit sixty-three through bit forty-eight of Result packed data.

At step 706, decoder 202 enables a register in integer registers 209 with DEST 605 address of the destination register. Thus, the Result is stored in the register addressed by DEST 605.

Table 2a illustrates the in-register representation of packed addition operation. The first row of bits is the packed data representation of a Source1 packed data. The second row of bits is the packed data representation of a Source2 packed data. The third row of bits is the packed data representation of the Result packed data. The number below each data element bit is the data element number. For example, Source1 data element 0 is $10001000_2$. Therefore, if the data elements are eight bits in length (byte data), and unsigned, unsaturated addition is performed, the ALU 203 produces the Result packed data as shown.

Note that in one embodiment of the present invention, where a result overflows or underflows and the operation is using unsaturate, that result is simply truncated. That is, the carry bit is ignored. For example, in Table 2a, the in-register representation of result data element one would be: $10001000_2 + 10001000_2 = 00001000_2$. Similarly, for underflows, the result is truncated. This form of truncation enables a programmer to easily perform modulo arithmetic. For example, an equation for result data element one can be expressed as: (Source1 data element one+Source2 data element one) mod 256=result data element one. Further, one skilled in the art would understand from this description that overflows and underflows could be detected by setting error bits in a status register.

TABLE 2a

| 00101010 | 01010101 | 01010101 | 11111111 | 10000000 | 01110000 | 10001111 | 10001000 |
|---|---|---|---|---|---|---|---|
| $+^7$ | $+^6$ | $+^5$ | $+^4$ | $+^3$ | $+^2$ | $+^1$ | $+^0$ |
| 10101010 | 01010101 | 10101010 | 10000001 | 10000000 | 11110000 | 11001111 | 10001000 |
| $=^7$ | $=^6$ | $=^5$ | $=^4$ | $=^3$ | $=^2$ | $=^1$ | $=^0$ |
| 11010100 | 10101010 | 11111111 | Overflow | Overflow | Overflow | Overflow | Overflow |
| 7 | 6 | 5 | 4 | 3 | 2 | 1 | 0 |

Table 2b illustrates the in-register representation of a packed word data addition operation. Therefore, if the data elements are sixteen bits in length (word data), and unsigned, unsaturated addition is performed, the ALU 203 produces the Result packed data as shown. Note that in word data element two, the carry from bit seven (see emphasized bits I below) propagated into bit eight, causing data element two to overflow (see emphasized overflow below).

TABLE 2b

| 00101010 01010101 | 01010101 11111111 | 10000000 01110000 | 10001111 10001000 |
|---|---|---|---|
| 3 | 2 | 1 | 0 |
| + | + | + | + |
| 10101010 01010101 | 10101010 10000001 | 10000000 11110000 | 11001111 10001000 |
| 3 | 2 | 1 | 0 |
| = | = | = | = |
| 11010100 10101010 | Overflow | Overflow | Overflow |
| 3 | 2 | 1 | 0 |

Table 2c illustrates the in-register representation of packed doubleword data addition operation. This operation is supported in an alternative embodiment of the present invention. Therefore, if the data elements are thirty-two bits in length (i.e., doubleword data), and unsigned, unsaturated addition is performed, the ALU 203 produces the Result packed data as shown. Note that carries from bit seven and bit fifteen of doubleword data element one propagated into bit eight and bit sixteen respectively.

TABLE 2c

| 00101010 01010101 01010101 11111111 1 | 10000000 01110000 10001111 10001000 0 |
|---|---|
| + | + |
| 10101010 01010101 10101010 10000001 1 | 10000000 11110000 11001111 100010000 0 |
| = | = |
| 11010100 10101011 00000000 10000000 1 | Overflow 0 |

To better illustrate the difference between packed addition and ordinary addition, the data from the above example is duplicated in Table 3. However, in this case, ordinary addition (sixty-four bit) is performed on the data. Note that the carries from bit seven, bit fifteen, bit twenty-three, bit thirty-one, bit thirty-nine and bit forty-seven have been carried into bit eight, bit sixteen, bit twenty-four, bit thirty-two, bit forty and bit forty-eight respectively.

TABLE 3

| 00101010 01010101 01010101 11111111 10000000 01110000 10001111 10001000 |
|---|
| + |
| 10101010 01010101 10101010 10000001 10000000 11110000 11001111 10001000 |
| = |
| 11010100 101010011 00000000 10000001 00000001 01100001 01011111 00010000 |

SIGNED/UNSATURATE PACKED ADDITION

Table 4 illustrates an example of a signed packed addition where the data element length of the packed data is eight bits. Saturation is not used. Therefore, results can overflow and underflow. Table 4 uses different data than Tables 1a–1c and Table 3.

TABLE 4

| 00101010 | 01010101 | 01010101 | 01111111 | 00000000 | 11110000 | 00001111 | 10001000 |
|---|---|---|---|---|---|---|---|
| $+^Z$ | $+^6$ | $+^5$ | $+^4$ | $+^3$ | $+^2$ | $+^1$ | $+^0$ |
| 10101010 | 01010101 | 10101010 | 00000001 | 00000000 | 11110000 | 00001111 | 10001000 |
| $=^Z$ | $=^6$ | $=^5$ | $=^4$ | $=^3$ | $=^2$ | $=^1$ | $=^0$ |
| 11010100 7 | Overflow 6 | 11111111 5 | Overflow 4 | 00000000 3 | Underflow 2 | 00011110 1 | Underflow 0 |

SIGNED/SATURATE PACKED ADDITION

Table 5 illustrates an example of a signed packed addition where the data element length of the packed data is eight bits. Saturate is used, therefore, overflow will be clamped to the maximum value, and underflow will be clamped to the minimum value. Table 5 uses the same data as Table 4. Here data element zero and data element two are clamped to the minimum value, while data element four and data element six are clamped to the maximum value.

TABLE 5

| 00101010 | 01010101 | 01010101 | 01111111 | 00000000 | 11110000 | 00001111 | 10001000 |
|---|---|---|---|---|---|---|---|
| $+^Z$ | $+^6$ | $+^5$ | $+^4$ | $+^3$ | $+^2$ | $+^1$ | $+^0$ |
| 10101010 | 01010101 | 10101010 | 00000001 | 00000000 | 11110000 | 00001111 | 10001000 |
| $=^Z$ | $=^6$ | $=^5$ | $=^4$ | $=^3$ | $=^2$ | $=^1$ | $=^0$ |
| 11010100 | 01111111 | 11111111 | 11111111 | 00000000 | 10000000 | 00011110 | 10000000 |
| 7 | 6 | 5 | 4 | 3 | 2 | 1 | 0 |

PACKED SUBTRACTION

Figure 7B:
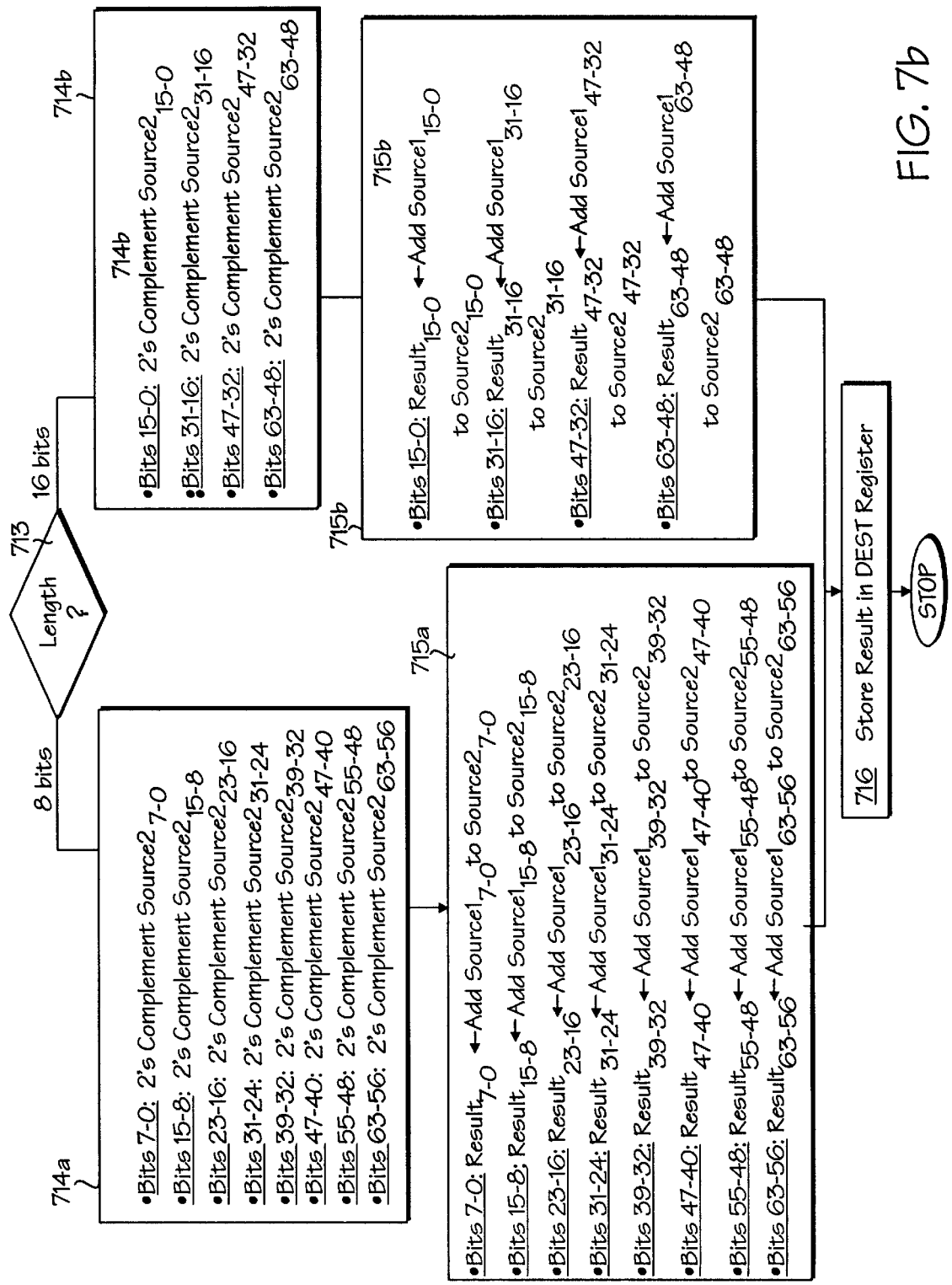
FIG. 7b illustrates the steps followed by the processor when subtracting packed data from packed data.

The preferred embodiment of the present invention enables packed subtraction operations to be performed in ALU 203. That is, the present invention enables each data element of a second packed data to be subtracted individually from each data element of a first packed data. FIG. 7b illustrates one method of performing a packed subtraction in the present invention. Note that steps 710–713 are similar to steps 701–704.

In the present embodiment of the invention, only eight bit and sixteen bit data element length packed subtraction is supported. However, in alternative embodiments of the present invention, thirty-two bit data element length packed subtraction is also supported. Further, although in the present embodiment of the invention, subtraction is performed by subtracting Source2 from Source1, in an alternate embodiment, subtraction is performed by subtracting Source1 from Source2.

Assuming data element length is eight bits, steps 714a and 715a are executed. ALU 203 2's complements bit seven through bit zero of Source2. In parallel with this 2's complement, ALU 203 2's complements bit fifteen through bit eight of Source2. In parallel with these 2's complements, ALU 203 2's complements bit twenty-three through bit sixteen of Source2. In parallel with these 2's complements, ALU 203 2's complements bit thirty-one through bit twenty-four of Source2. In parallel with these 2's complements, ALU 203 2's complements bit thirty-nine through bit thirty-two of Source2. In parallel with these 2's complements, ALU 203 2's complements bit forty-seven through bit forty of Source2. In parallel with these 2's complements, ALU 203 2's complements bit fifty-five through bit forty-eight of Source2. In parallel with these 2's complements, ALU 203 2's complements bit sixty-three through bit fifty-six of Source2. At step 715a, ALU 203 performs the addition of the 2's complemented bits of Source2 to the bits of Source1 as generally described for step 705a.

Assuming data element length is sixteen bits, steps 714b and 715b are executed. ALU 203 2's complements bit fifteen through bit zero of Source2. In parallel with this 2's complement, ALU 203 2's complements bit thirty-one through bit sixteen of Source2. In parallel with these 2's complements, ALU 203 2's complements bit forty-seven through bit thirty-two of Source2. In parallel with these 2's complements, ALU 203 2's complements bit sixty-three through bit forty-eight of Source2. At step 715a, ALU 203 performs the addition of the 2's complemented bits of Source2 to the bits of Source1 as generally described for step 705b.

Note that steps 714 and 715 are the method used in one embodiment of the present invention to subtract a first number from a second number. However, other forms of subtraction are known in the art and this invention should not be considered limited to using 2's complement arithmetic.

At step 716, decoder 202 enables integer registers 209 with the destination address of the destination register. Thus, the result packed data is stored in the DEST register of integer registers 209.

Table 6 illustrates the in-register representation of packed subtraction operation. Assuming the data elements are eight bits in length (byte data), and unsigned, unsaturated subtraction is performed, then ALU 203 produces the result packed data as shown.

TABLE 6

| 00101010 | 01010101 | 01010101 | 01111111 | 00000000 | 11110000 | 00001111 | 10001000 |
|---|---|---|---|---|---|---|---|
| $+^Z$ | $+^6$ | $+^5$ | $+^4$ | $+^3$ | $+^2$ | $+^1$ | $+^0$ |
| 10101010 | 01010101 | 10101010 | 00000001 | 00000000 | 11110000 | 00001111 | 10001000 |
| $=^Z$ | $=^6$ | $=^5$ | $=^4$ | $=^3$ | $=^2$ | $=^1$ | $=^0$ |
| Underflow | 00000000 | Underflow | 01111110 | 00000000 | 00000000 | 00000000 | 00000000 |
| 7 | 6 | 5 | 4 | 3 | 2 | 1 | 0 |

PACKED DATA CIRCUITS

Figure 8:
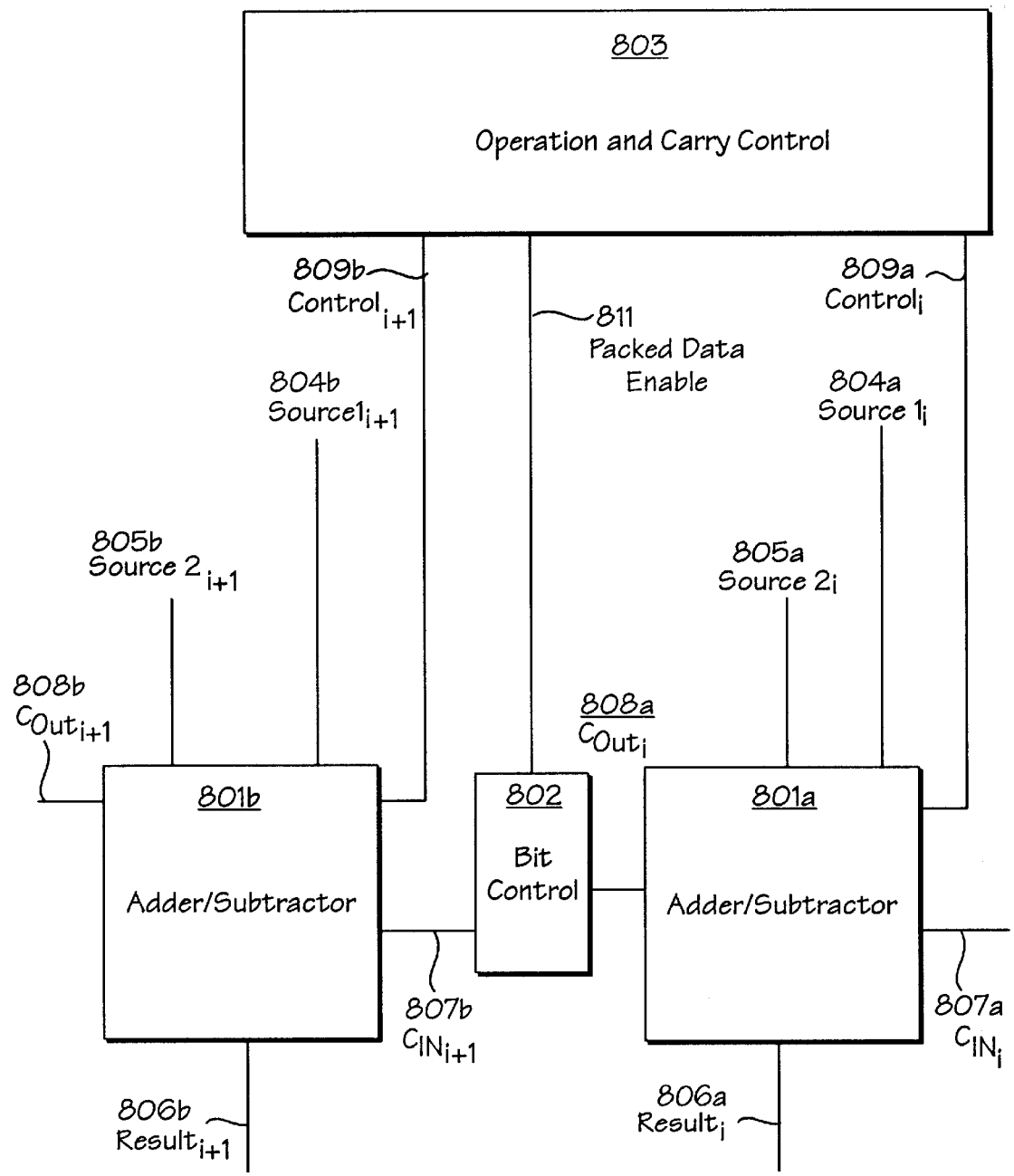
FIG. 8 illustrates a circuit capable of manipulating individual bits of packed data.
Figure 9:
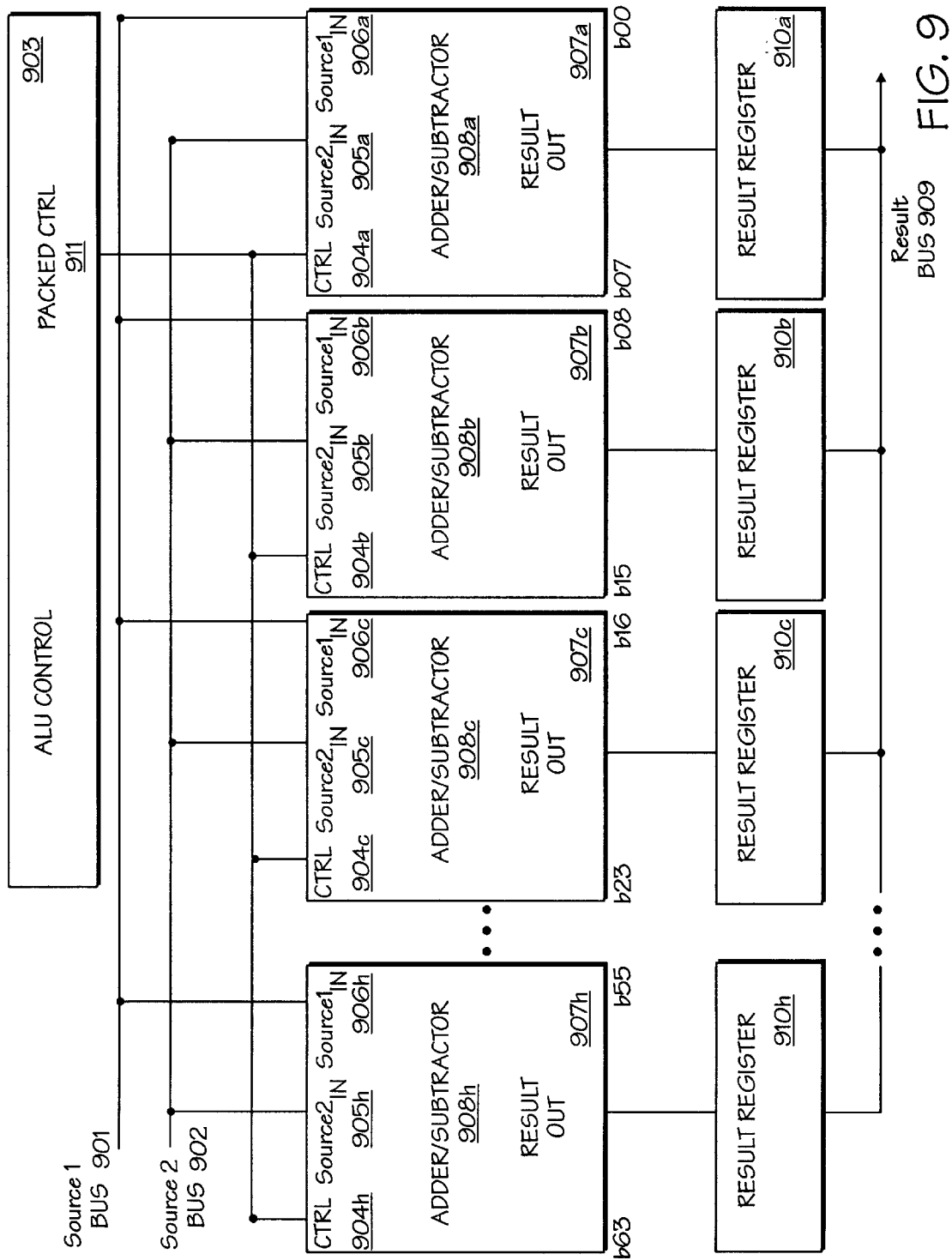
FIG. 9 illustrates one embodiment of a circuit implementing the present invention whereby the circuit is capable of manipulating packed byte data.
Figure 10:
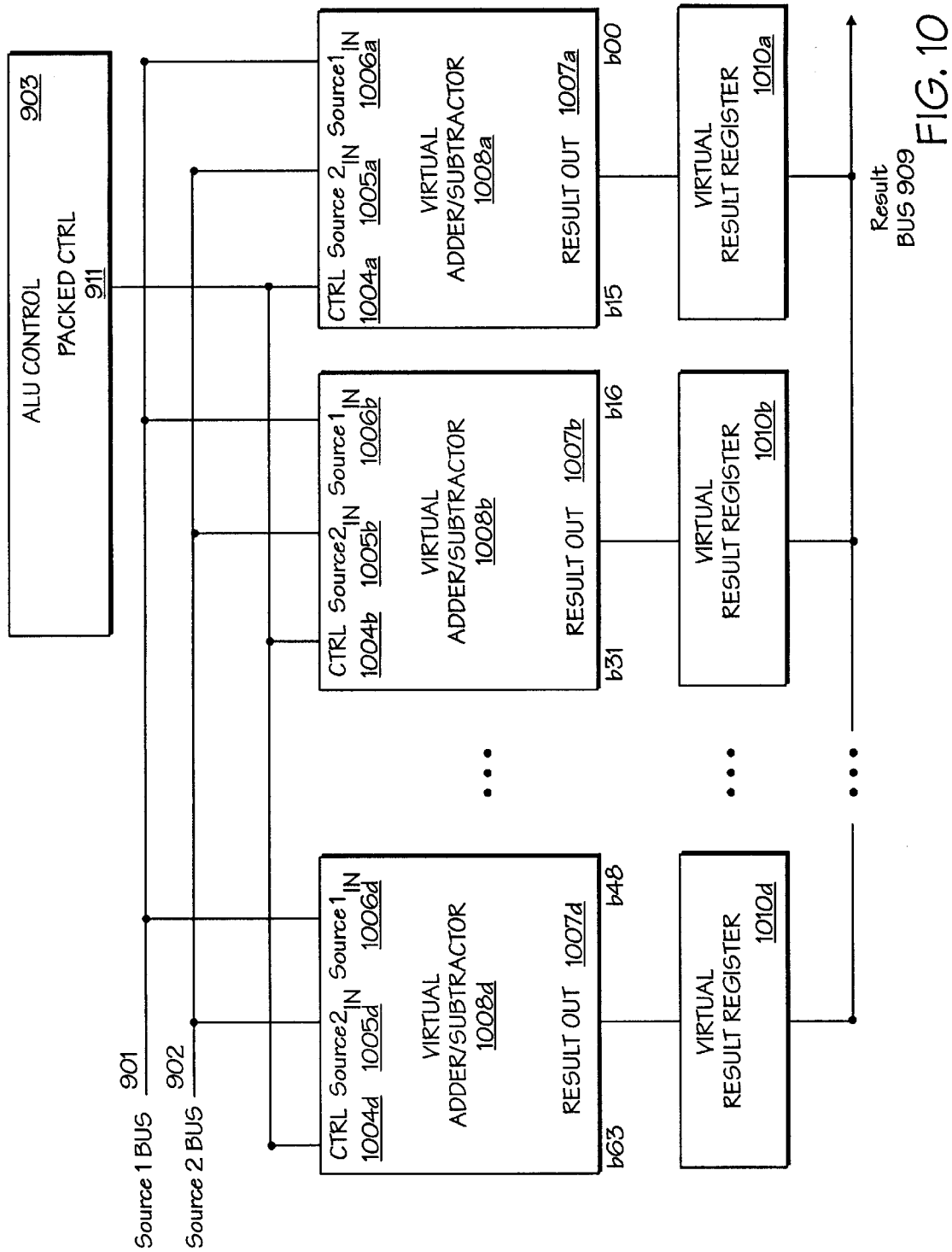
FIG. 10 illustrates a logical view of one embodiment of the present invention whereby the circuit is capable of manipulating packed word data.
Figure 11:
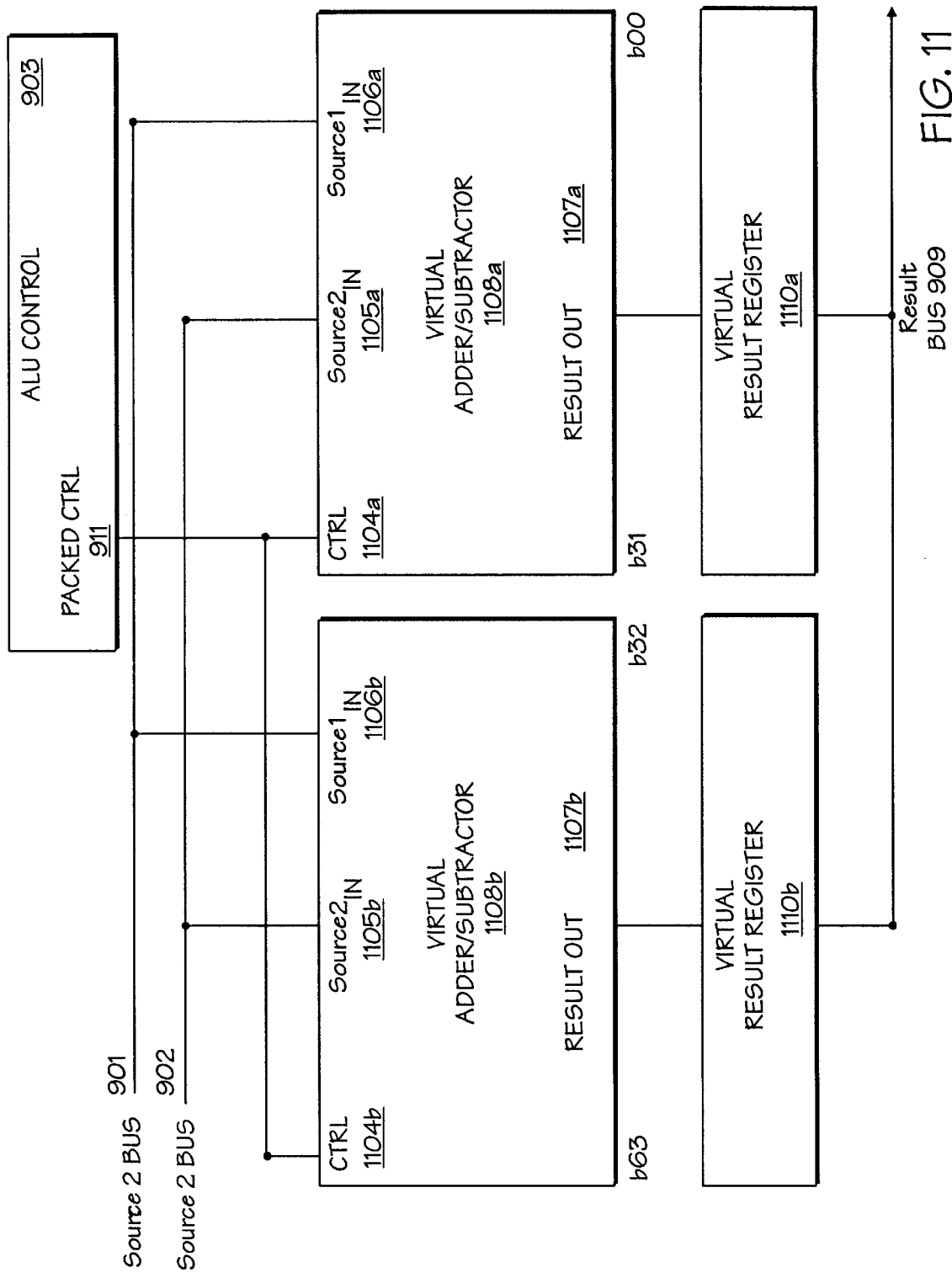
FIG. 11 illustrates a logical view of an alternate embodiment of the present invention whereby the circuit is capable of manipulating packed doubleword data.

The preferred embodiment of the present invention employs numerous circuits to implement the invention. FIG. 8 illustrates a circuit capable of manipulating individual bits of packed data. FIG. 9 illustrates a view of one embodiment of the present invention whereby a circuit is capable of manipulating packed byte data. FIGS. 10 and 11 illustrate logical views of the FIG. 9 circuit whereby the circuit is enabled to manipulate packed word and packed doubleword data respectively.

FIG. 8 illustrates a modified bit slice adder/subtractor. Adder/subtractor 801a–b enable two bits from Source2 to be added to, or subtracted from, Source1. Operation and carry control 803 transmits to control 809a control signals to enable an addition or subtraction operation. Thus, adder/subtractor 801a adds or subtracts bit i received on Source2$_i$ 805a to bit i received on Source1$_i$ 804a, producing a result bit transmitted on Result$_i$ 806a. Cin 807a–b and Cout 808a–b represent carry control circuitry as is commonly found on adder/subtractors.

Bit control 802 is enabled from operation and carry control 803 via packed data enable 811 to control $C_{in_{i+1}}$ 807b and $C_{out_i}$. For example, in Table 7a, an unsigned packed byte addition is performed. If adder/subtractor 801a adds Source1 bit seven to Source2 bit seven, then operation and carry control 803 will enable bit control 802, stopping the propagation of a carry from bit seven to bit eight.

TABLE 7a

| | | | | | | 00001111 | 10001000 |
|---|---|---|---|---|---|---|---|
| ... 7 | ... 6 | ... 5 | ... 4 | ... 3 | ... 2 | 1 | 0 |
| + | + | + | + | + | + | + | + |
| ... 7 | ... 6 | ... 5 | ... 4 | ... 3 | ... 2 | 00001111 1 | 10001000 0 |
| = | = | = | = | = | = | = | = |
| ... 7 | ... 6 | ... 5 | ... 4 | ... 3 | ... 2 | 00011110 1 | Overflow 0 |

However, if an unsigned packed word addition is performed, and 801a is similarly used to add bit seven of Source1 to bit seven of Source2, bit control 802 propagates the carry to bit eight. Table 7b illustrates this result. This propagation would be allowed for packed doubleword addition as well as unpacked addition.

TABLE 7b

| | | | 00001111 10001000 |
|---|---|---|---|
| ... 3 | ... 2 | ... 1 | 0 |
| + | + | + | + |
| ... 3 | ... 2 | ... 1 | 00001111 10001000 0 |
| = | = | = | = |
| ... 3 | ... 2 | ... 1 | 00011111 00010000 0 |

Adder/subtractor 801a subtracts bit Source2$_i$ 805a from Source1$_i$ 804a by first forming the 2's complement of Source2$_i$ 805$_a$ by inverting Source2$_i$ 805a and adding one. Then adder/subtractor 801a adds this result to Source1$_i$ 804$_a$. Bit slice 2's complementing techniques are well known in the art, and one skilled in the art would understand how to design such a bit slice 2's complementing circuit. Note that propagation of carries are control by bit control 802 and operation and carry control 803.

FIG. 9 illustrates a circuit capable of performing a packed byte addition on two sixty-four bit registers. Source1 bus 901 and Source2 bus 902 carry the information signals to the adder/subtractors 908a–h via Source1 in 906a–h and Source$^2$in 905a–h respectively. Thus, adder/subtractor 908a adds/subtracts Source2 bit seven through bit zero to/from Source1 bit seven through bit zero; adder/subtractor 908b adds/subtracts Source2 bit fifteen through bit eight to/from Source1 bit fifteen through bit eight, etc. CTRL 904a–h receives, from ALU control 903, via packed control 911, control signals disabling the propagation of carries, enabling/disabling saturate, and enabling/disabling signed/unsigned arithmetic. ALU control 903 disables propagation of carries by receiving carry information from CTRL 904a–h and not propagating it to the next most significant adder/subtractor 908a–h. Thus, ALU control 903 performs the operations of the operation and carry control 803 and the bit control 802 for 64 bit packed data. One skilled in the art would be able create such a circuit given the illustrations in FIGS. 1–9 and the above description.

Adder/subtractors 908a–h communicate result information, via result out 907a–h, of the various packed additions to result register 910a–h. Each result register 910a–h stores and then transmits the result information onto Result bus 909. This result information is then stored in the integer register specified by the DEST 605 register address.

FIG. 10 illustrates a logical view of the operation of the circuit of FIG. 9. Here, packed word operations are being performed. Propagations of carries between bit eight and bit seven, bit twenty-four and bit twenty-three, bit forty and bit thirty-nine, and bit fifty-six and bit fifty-five are enabled by ALU control 903. Thus, adder/subtractor 908a and 908b, shown as virtual adder/subtractor 1008a, will act together to add/subtract the first word of packed word data Source2 (bit fifteen through bit zero) to/from the first word of packed word data Source1 (bit fifteen through bit zero); adder/subtractor 908c and 908d, shown as virtual adder/subtractor 1008b, will act together to add/subtract the second word of packed word data Source2 (bit thirty-one through bit sixteen) to/from the second word of packed word data Source1 (bit thirty-one through bit sixteen), etc.

Virtual adder/subtractors 1008a–d communicate result information, via result out 1007a–d (combined result outs 907a–b, 907c–d, 907e–f and 907g–h), to virtual result registers 1010a–d. Each virtual result register 1010a–d (combined result registers 910a–b, 910c–d, 910e–f and 910g–h) stores a sixteen bit result data element to be communicated onto Result bus 909.

Although, the preferred embodiment of the present invention does not support packed doubleword addition and subtraction, an alternative embodiment would support these operations. FIG. 11 illustrates a logical view of such an operation of the circuit of FIG. 9. Propagations of carries between bit eight and bit seven, bit sixteen and bit fifteen, bit twenty-four and bit twenty-three, bit forty and bit thirty-nine, bit forty-eight and bit forty-seven, and bit fifty-six and bit fifty-five are enabled by ALU control 903. Thus, adder/subtractors 908a–d, shown as virtual adder/subtractor 1108a, act together to add/subtract the first doubleword of packed doubleword data Source2 (bit thirty-one through bit zero) to/from the first doubleword of packed word data Source1 (bit thirty-one through bit zero); adder/subtractors 908e–h, shown as virtual adder/subtractor 1108b, act together to add/subtract the second doubleword of packed doubleword data Source2 (bit sixty-three through bit thirty-two) to/from the second doubleword of packed doubleword data Source1 (bit sixty-three through bit thirty-two).

Virtual adder/subtractors 1108a–b communicate result information, via result out 1107a–b (combined result outs 907a–d and 907e–h), to virtual result registers 1100a–b. Each virtual result register 1110a–b (combined result registers 910a–d and 910e–h) stores a thirty-two bit result data element to be communicated onto Result bus 909.

Circuit Descriptions

The convention followed in the subsequent descriptions of circuits is that the bus names correspond to the signal names on that bus. For example, a Source1 signal is on a Source1 bus. Busses with multiple bits may be designated with particular bit ranges. For example, Source1<31:16> indicates that the bus corresponds to bits 31 through 16 of the Source1 bus. The whole bus may be referred to as the Source1 bus or Source1<63:0>(for a 64 bit bus). The complement of a signal may be referred to by appending an "#" after the signal name. For example, the complement of the Source1 signal on the Source1 bus is a Source1# signal on a Source1# bus.

Packed Adder/Subtractor Circuit

One embodiment of a packed adder/subtractor circuit is capable of performing a packed addition or packed subtraction on packed data elements which each contain two 32-bit values, four 16-bit data values, or eight 8-bit values. The packed adder/subtractor circuit adds three pairs of "dummy" bits between each byte of the two 32-bit data elements along with the 32-bit packed data elements to produce a 32-bit sum. A carry-input is used to add one during subtractions according to well-known methods. The three pairs of dummy bits between each byte are used to control the carry between each byte of the packed data elements. The sum of each pair of dummy bits is ignored in producing the 32-bit result. When a pair of these bits corresponds to a boundary between values in the packed data elements, zeroes or ones are generated depending on whether an add or subtract is to be performed and whether the packed data element is Source1 or Source2. Zero inputs on a pair of dummy bits (the corresponding bits of Source1 and Source2) disable the carry from the lower byte to the higher order byte according to two's complement arithmetic that is well known in the art. This is used during addition at the boundaries of values of Source1 and Source2. One inputs on a pair of dummy bits add one to the complement of the higher order bytes of Source2 to produce the two's complement of the higher order bytes at each boundary between values of Source2 during subtraction operations according to two's complement arithmetic that is well known in the art. Since dummy bits do not control the carry-input of the lowest order byte of Source1 and Source2, the 35-bit adder with carry-in adds one to the lowest order byte during subtraction operations according to well-known methods. When one of these dummy bits does not correspond to a boundary between values in the packed data element, the highest order bit from the lower order byte is copied into this dummy bit. This forces the carry from the lower order byte to propagate into the carry input of the higher order byte according to two's complement arithmetic that is well known in the art. In another embodiment, a carry from the lower order byte is forced into the carry input of the higher order byte by inputting a one into one of the pair of dummy bits and a zero into the other one of the pair of dummy bits according to two's complement arithmetic that is well known in the art. Since the selection of the value for each dummy bit is performed in parallel with the selection of Source2 or its complement depending on whether a subtraction is performed, no additional time is required over a standard adder/subtractor circuit.

Figure 12:
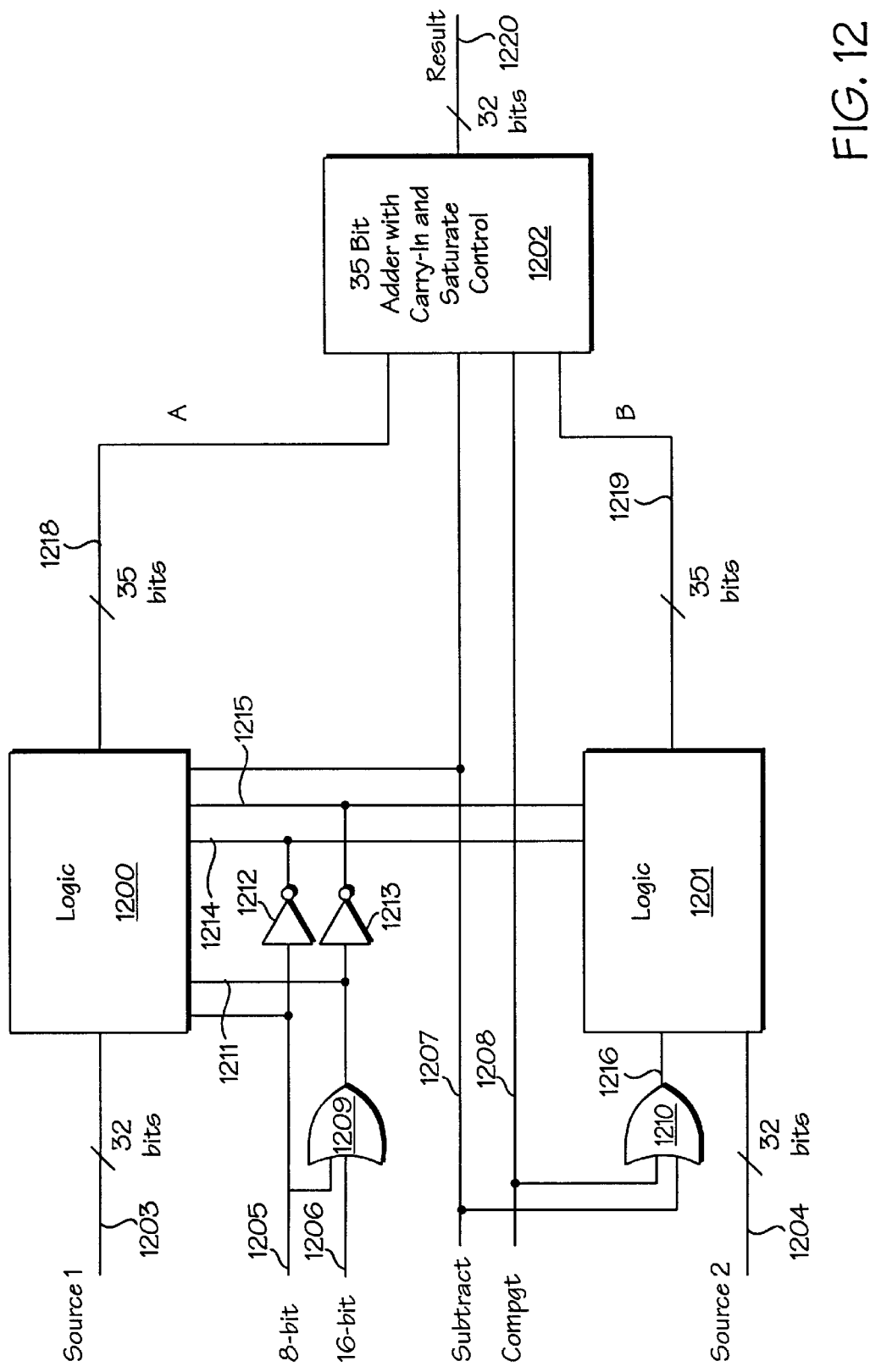
FIG. 12 illustrates another embodiment of a Packed Add/Subtract circuit.

FIG. 12 illustrates one embodiment of an adder/subtractor circuit that is capable of performing additions and subtractions on one 32-bit data element, two 16-bit data elements, or eight 8-bit data elements. In order to perform operations on 64-bit data elements which can contain two 32-bit values, four 16-bit data values, or eight 8-bit values, two of the adder/subtractor circuits illustrated in FIG. 12 may be used, one for the most-significant 32-bits of the packed data element, and one for the least-significant 32-bit of the packed data element. A pair of dummy bits for controlling the carry from the least significant 32-bit data element into the most significant 32-bit data element may be used for 64-bit scalar additions and/or subtractions.

A Source1 bus 1203 and a Source2 bus 1204 each contain 32 bits of data that may be in one of several formats. The Source1 bus 1203 is coupled to logic 1200 which generates a 35-bit value (having the dummy bits embedded in the appropriate positions) on an A bus 1218. The Source2 bus 1204 is coupled to logic 1201 which generates a 35-bit value (having the dummy bits embedded in the appropriate positions) on a B bus 1219. A byte-indicator bus 1205 is driven high when Source1 and Source2 are packed byte data and low if Source1 and Source2 are packed word data or packed dword data. A word-indicator bus 1206 is driven high when Source1 and Source2 are packed word data and low if Source1 and Source2 are packed byte data or packed dword data. The byte-indicator bus 1205 is coupled to the input of inverter 1212 which drives byte-indicator# bus 1214. The byte-indicator bus 1205 and the word-indicator bus 1206 are coupled to the inputs of OR gate 1209 which drives byte-or-word indicator bus 1211. The byte or word indicator bus 1211 is coupled to the input of inverter 1213 which drives byte or word indicator# bus 1215. A subtract bus 1207 is driven high if the operation is a subtract. The byte-indicator bus 1205, the byte-indicator# bus 1214, the byte-or-word-indicator bus 1211, the byte-or-word-indicator# bus 1215, and the subtract bus 1207 are coupled to logic 1200. A compgt bus 1208 is driven high if the operation is a compare greater-than (compgt) operation. The subtract bus 1207 and the compgt bus 1208 are coupled to the inputs of OR gate 1210 which drives the subtract-or-compgt bus 1216. The byte-indicator# bus 1214, the byte-or-word-indicator# bus 1215, and the subtract-or-compgt bus 1216 are coupled to logic 1201.

The subtract bus 1207, the compgt bus 1208, the A bus 1218, and the B bus 1219 are coupled to a 35-bit adder 1202. In one embodiment, the 35-bit adder 1202 has a carry-in input that is coupled to the subtract bus 1207 to add 1 to the least significant value of the packed data for subtract operations by driving a one into the carry-in input of the 35-bit adder 1202 according to well-known methods. In one embodiment, the signals on the subtract bus 1207, the compgt bus 1208, the byte-indicator bus 1205 and the word-indicator bus 1206 are decoded from a control signal 207 (referring to FIG. 2).

The (35-bit) A bus 1218, the (35-bit) B bus 1219, the compact bus 1208 and the subtract bus 1207 are coupled to the inputs of the 35-bit adder 1202 which drives a (32-bit) result bus 1220. After an addition operation is performed, each value of the result is the sum of the corresponding values of Source1 and Source2. After a subtraction operation is performed, each value of the result is the difference of the corresponding values of Source1 and Source2. After a compgt operation is performed, each value of the result is all ones when the corresponding value of Source1 is greater than the corresponding value of Source2 and all zeroes otherwise. The result bus 1220 does not include the bits corresponding to the sum of the dummy bits. The dummy bits are simply used to control the carry between the bytes depending on whether their is a boundary between packed data values corresponding to that bit and whether the operation is an addition or subtraction. The subtract operation controls whether the lowest order value of B should be incremented by one to adjust the complement of Source2 to be the two's complement of Source2 for subtraction operations. The dummy bits are positioned to add one to all of the values in the packed data for subtractions except for the lowest order value.

In one embodiment, the 35-bit adder 1202 includes saturation control logic. The saturation control logic overrides the sum with other values driven onto the result bus 1220, depending on the value of the sum. When there is an overflow condition for a value of the sum, the corresponding value of the result is the maximum value representable. When there is an underflow condition for a value of the sum, the corresponding value of the result is the minimum value representable. When neither an overflow or underflow condition exists for a value of the sum, the corresponding value of the result is the sum of the addition performed by the 35-bit adder 1202. In other embodiments, other conditions and alternative values may be used.

In one embodiment, the 35-bit adder 1202 is capable of performing a packed compare operation by forcing each value of the packed result to all ones or all zeroes depending on the result of a comparison of Source1 and Source2. In one embodiment, Source1−Source2+1 is computed by complementing the Source2 input and performing an addition as described above. For each value in the packed data, the compare result is computed as follows:

compare=sign bit XNOR (carry-out XOR carry-in)

"Sign bit" indicates the sign bit (the most-significant bit in two's complement format) of the corresponding value of the packed data element. "Carry-out" indicates the carry-output of the most-significant bit of the corresponding value of the packed data element. "Carry-in" indicates the carry-input of the least-significant bit of the corresponding value of the packed data element. When the compare result is one, the corresponding value of the packed result is all ones. When the compare result is zero, the corresponding value of the packed result is all zeroes.

Figure 13:
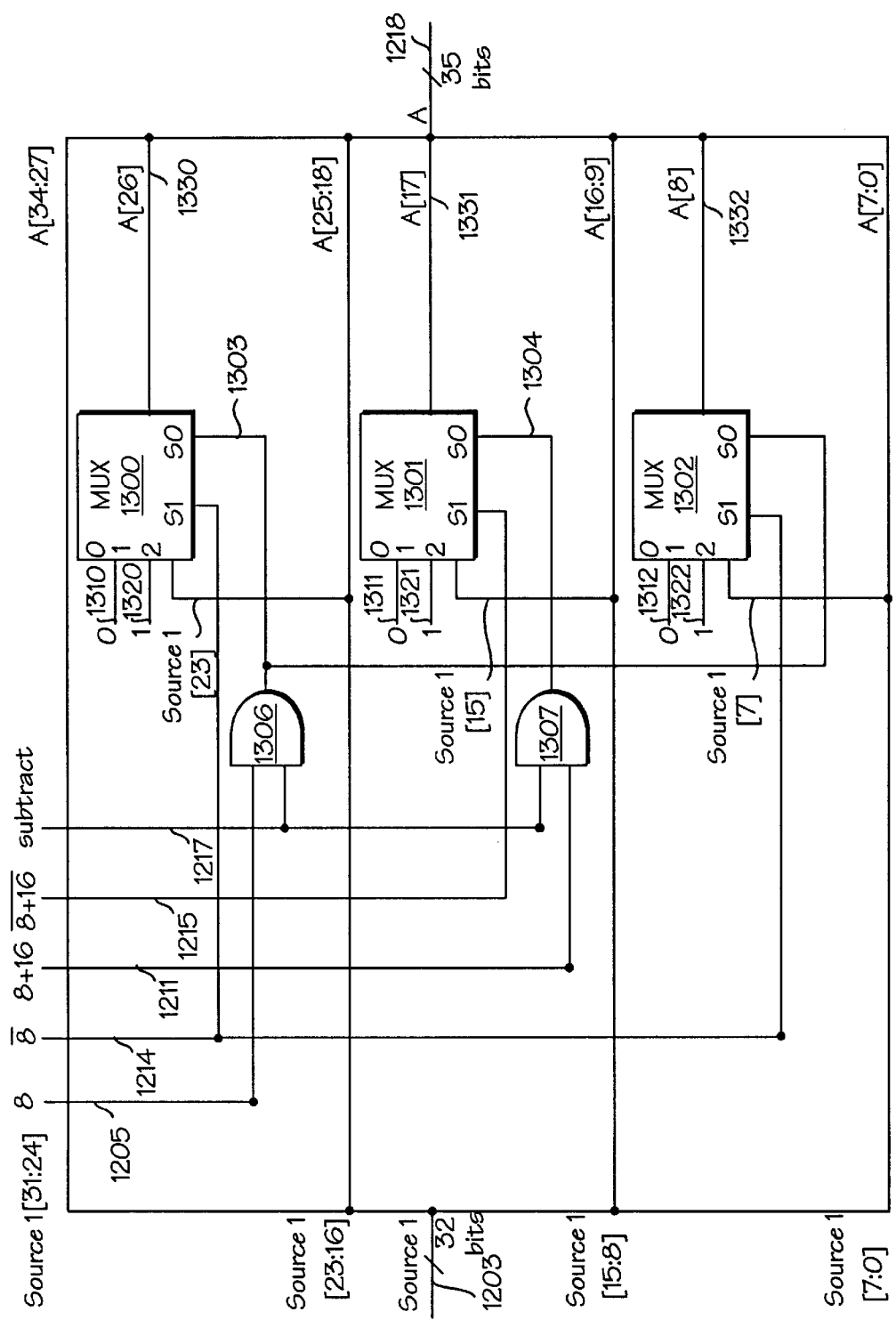
FIG. 13 illustrates one embodiment of a Logic 1200.

FIG. 13 illustrates one embodiment of Logic 1200. Source1[31:24], Source1[23:16], Source1[15:8], Source1 [7:0] of the Source1 bus 1203 are coupled to A[34:27], A[25:18], A[16:9], and A[7:0] of the A bus 1218, respectively. Each of these groups of data correspond to the smallest values represented in the packed data format (in this embodiment, a byte). When Source1 and Source2 are packed byte data, the values are added independently by forcing the dummy bits to have values that disable carry propagation between values of the packed data. When Source1 and Source2 are packed word data, the dummy bit corresponding to A[17] is selected (along with the dummy bit corresponding to B[17] described below) such that carries do not propagate from the lower order adjacent word to the higher order adjacent word and A[8] and A[26] are selected (along with the dummy bits corresponding to B[8] and B[26] described below) such that carries propagate from the least significant byte of the corresponding word to the most-significant byte of the corresponding word. When Source1 and Source2 are packed dword data, the dummy bits corresponding to A[8], A[17], and A[26] are selected (along with the dummy bits corresponding to B[8], B[17], and B[26] described below) such that carries propagate through all bytes of the dword.

A zero is input to the 0 inputs of mux1302 through zero busses 1310–1312, respectively. A one is input to the 1 inputs of mux1302 through one busses 1320–1322, respectively. Source1[23], Source1[15], and Source1[7] of the Source1 bus 1203 are coupled to the 2 inputs of mux1302, respectively.

The byte-indicator bus 1205 and the subtract bus 1217 are coupled to the inputs of AND gate 1306 which drives the subtract-byte bus 1303. The subtract-byte bus 1303 is coupled to the select zero (S0) inputs of the mux and the mux. The byte-indicator# bus 1214 is coupled to the select one (S1) input of the mux1300 and the mux1302.

The mux1300 and the mux1302 correspond to a byte boundary of the packed data but do not correspond to a word or dword boundary. When the operation operates on packed byte data (the high order select input is zero), a zero input is selected if the operation is not a subtract (the low order select input is zero) and a one input is selected if the operation is a subtract (the low order select input is one). A zero input disables the carry between the two adjacent values of the packed data so that a packed addition, for example, of the bytes may be performed. A one input forces a one to be added to the higher order value of the adjacent values so that a packed subtraction of the bytes may be performed. The addition of one to the complement of each value of Source2 (described below) produces the two's complement of each value of Source2 except the lowest order value. A one is added to the lowest order value by the adder according to well-known methods for scalar adders since dummy bits are not used to control the carry-input of the lowest order value. Adding the two's complement of Source2 to Source1 produces the same result as subtracting Source2 from Source1. When the operation does not operate on packed byte data (the high order select input is one), the most-significant bit of the lower order adjacent value is selected. This propagates the carry from the lower order adjacent byte to the higher order adjacent byte.

The byte-or-word-indicator bus 1211 and the subtract bus 1217 are coupled to the inputs of AND gate 1307 which drives the subtract-byte-or-word bus 1304. The subtract-byte-or-word bus 1304 is coupled to the select zero (S0) inputs of the mux. The byte-or-word indicator# bus 1215 is coupled to the select one (S1) input of the mux.

The mux1301 corresponds to a byte boundary and a word boundary of the packed data but does not correspond to a dword boundary. When the operation operates on packed byte data or packed word data (the high order select input is zero), a zero input is selected if the operation is not a subtract (the low order select input is zero) and a one input is selected if the operation is a subtract (the low order select input is one). A zero input disables the carry between the two adjacent independent values of the packed data so that a packed addition, for example, of the bytes may be performed. A one input forces a one to be added to an the more significant of the adjacent values so that a packed subtraction of the bytes or words may be performed. When the operation does not operate on packed byte or packed word data (the high order select input is one), the most-significant bit of the next lower order adjacent value is selected. This forces the carry from the next lower order byte to the next higher order byte.

Muxes1302–1302 produce A[26], A[17], and A[8] (the dummy bits) of the A bus 1218, respectively.

Figure 14:
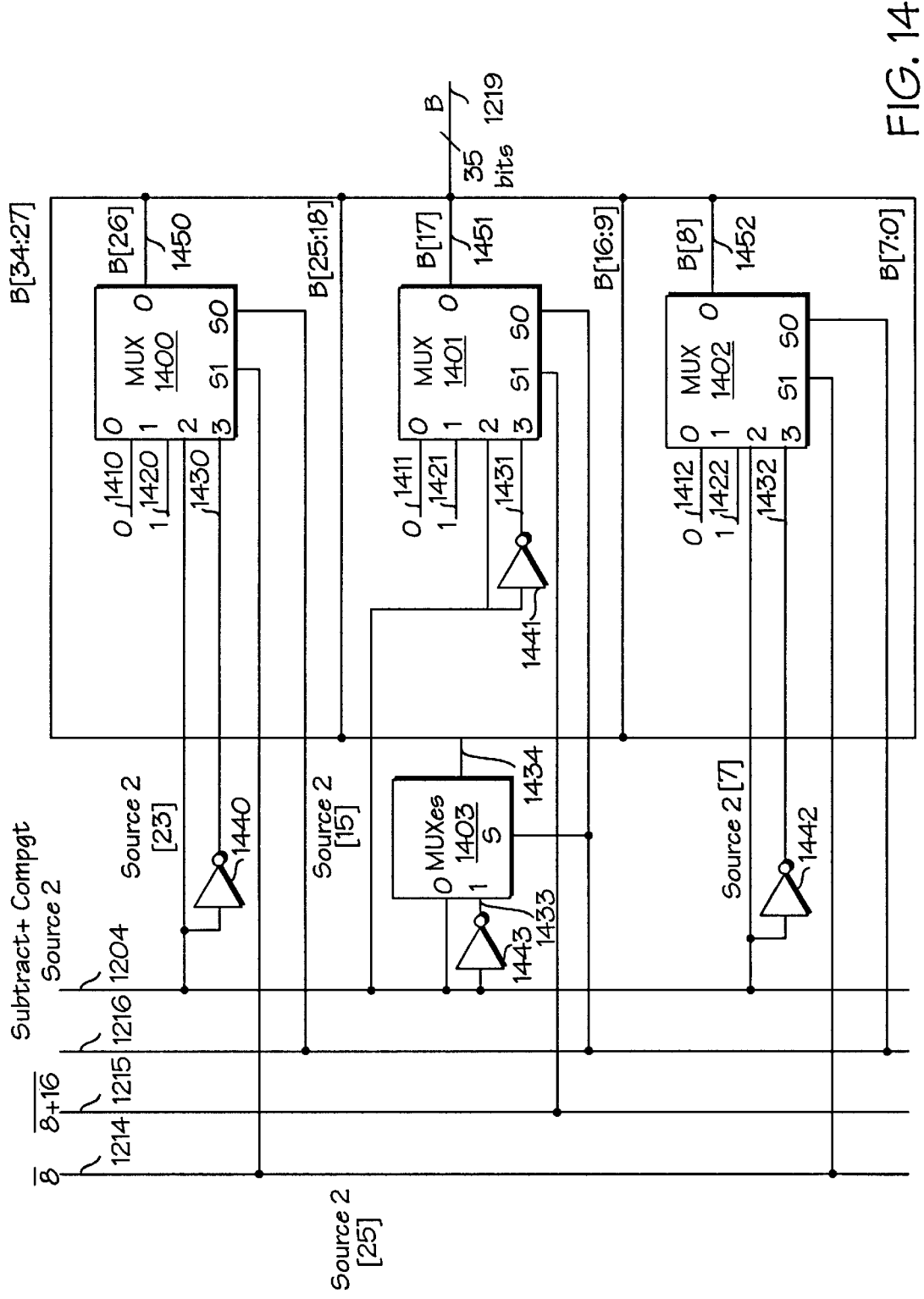
FIG. 14 illustrates one embodiment of a Logic 1201.

FIG. 14 illustrates one embodiment of Logic 1201. Each bit of the Source2 bus 1204 is coupled to the zero input of a corresponding one of Muxes 1403. Each bit of the Source2 bus 1204 is coupled to a corresponding one of a set of inverters 1443 to drive the complement of the bit onto the Source2# bus 1433. Each bit of the Source2 bus 1204 is coupled to the one input of a corresponding one of Muxes 1403 which drive corresponding bits of bus 1434 depending on the select input which is coupled to the subtract+copgt bus 1216. bus[31:24], bus[23:16], bus[15:8], bus[7:0] of the bus 1434 are coupled to B[34:27], B[25:18], B[16:9], and B[7:0] of the B bus 1219, respectively. Each of these groups of data correspond to the smallest values represented in the packed data format.

A zero is input to the 0 inputs of muxes1400–1402 through zero busses 1410–1412, respectively. A one is input to the 1 inputs of mux1400–1402 through zero busses 1420–1422, respectively. Source2[25], Source2[15] and Source2[7] of the Source2 bus 1204 are coupled to the 2 inputs of mux1400–1402, respectively. Source2[23] of the Source2 bus 1204 is coupled to an inverter 1440 which drives the Source2#[23] bus 1430. Source2[15] of the Source2 bus 1204 is coupled to an inverter 1441 which drives the Source2#[15] bus 1431. Source2[7] of the Source2 bus 1204 is coupled to an inverter 1442 which drives the Source2[7]# bus 1432. The Source2#[23] bus 1430, Source2#[15] bus 1431, and Source2#[7] bus 1432 are coupled to the 3 inputs of mux1400–1402, respectively.

The subtract-or-compgt bus 1216 is coupled to the select zero (S0) inputs of the mux1400 and mux1402. The byte-indicator# bus 1214 is coupled to the select one (S 1) input of the mux1400 and the mux1402.

The mux1400 and the mux1402 correspond to a byte boundary of the packed data but do not correspond to a word or dword boundary. When the operation operates on packed byte data (the high order select input is zero), a zero input is selected if the operation is not a subtract or a compare greater-than operation (the low order select input is zero) and a one input is selected if the operation is a subtract or a compare greater-than operation (the low order select input is one). Zero inputs on a pair of dummy bits disables the carry between the two adjacent values of the packed data so that a packed addition, for example, of the bytes may be performed. A one input forces a one to be added to the higher order adjacent value so that a packed subtraction of the bytes may be performed. The addition of one to the complement of each value of Source2 (except the lowest order value) produces the two's complement of each value of Source2 (except the lowest order value). A one is added to the lowest order value by the 35-bit adder 1202 according to well-known methods for scalar adders. Adding the two's complement of Source2 to Source1 produces the same result as subtracting Source2 from Source1. When the operation does not operate on packed byte data (the high order select input is one), the most-significant bit of the adjacent value is selected if the operation is not a subtract or a compare greater than operation (the low order select input is zero) and the complement of the most-significant bit of the adjacent value is selected if the operation is a subtract or a compare greater-than operation (the low order select input is one). This forces the carry from the lower order adjacent byte to the higher order adjacent byte.

The subtract-or-compgt bus 1216 is coupled to the select zero (SO) inputs of the mux1401. The byte-or-word indicator# bus 1215 is coupled to the select one (S1) input of the mux1401.

The mux1401 corresponds to a byte boundary and a word boundary of the packed data but does not correspond to a dword boundary. When the operation operates on packed byte data or packed word data (the high order select input is zero), a zero input is selected if the operation is not a subtract or a compare greater-than operation (the low order select input is zero) and a one input is selected if the operation is a subtract or a compare greater-than operation (the low order select input is one). A zero input disables the carry between the two adjacent values of the packed data so that a packed addition, for example, of the bytes may be performed. A one input forces a one to be added to the higher order adjacent value so that a packed subtraction of the bytes or words may be performed. When the operation does not operate on packed byte or word data (the high order select input is one), the most-significant bit of the adjacent value is selected if the operation is not a subtract or a compare greater-than operation (the low order select input is zero) and the complement of the most-significant bit of the adjacent value is selected if the operation is a subtract or a compare greater-than operation (the low order select input is one). This forces the carry from the lower order adjacent byte to the higher order adjacent byte.

Muxes1400–1402 produce B[26], B[17], and B[8] (the dummy bits) of the B bus 1219, respectively.

While FIGS. 12, 13, and 14 illustrate one implementation of a packed adder and/or packed subtractor, any number of alternative packed adder and/or packed subtractor circuits could be used.

Adder/Subtractor Method

Figure 15:
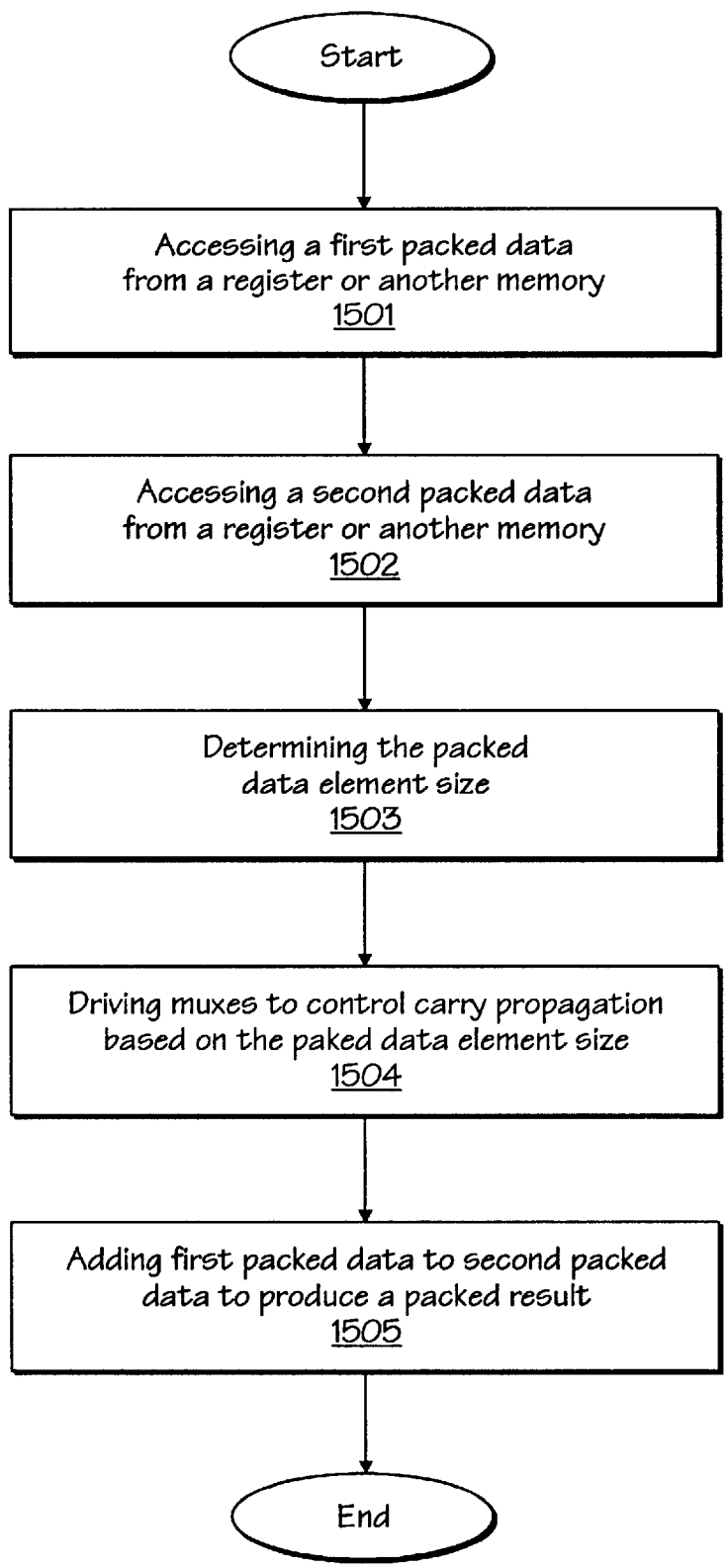
FIG. 15 is a flow graph describing one embodiment of the steps for performing a packed add operation.

FIG. 15 illustrates one embodiment of a method to perform a packed add operation.

At Step 1501, a first packed data is accessed to from a register or another memory.

At Step 1502, a second packed data is accessed to from a register or another memory.

At Step 1503, the packed data element size is determined. The packed data element size may be a byte, word, or doubleword, for example. In one embodiment, the packed data element size is determined based on the control signal 207 (referring to FIG. 2).

At Step 1504, the muxes are driven to control the carry propagation based on the packed data element size determined in Step 1503 according to the methods described above.

At Step 1505, the first packed data and the second packed data are added to produce a packed data result.

Figure 16:
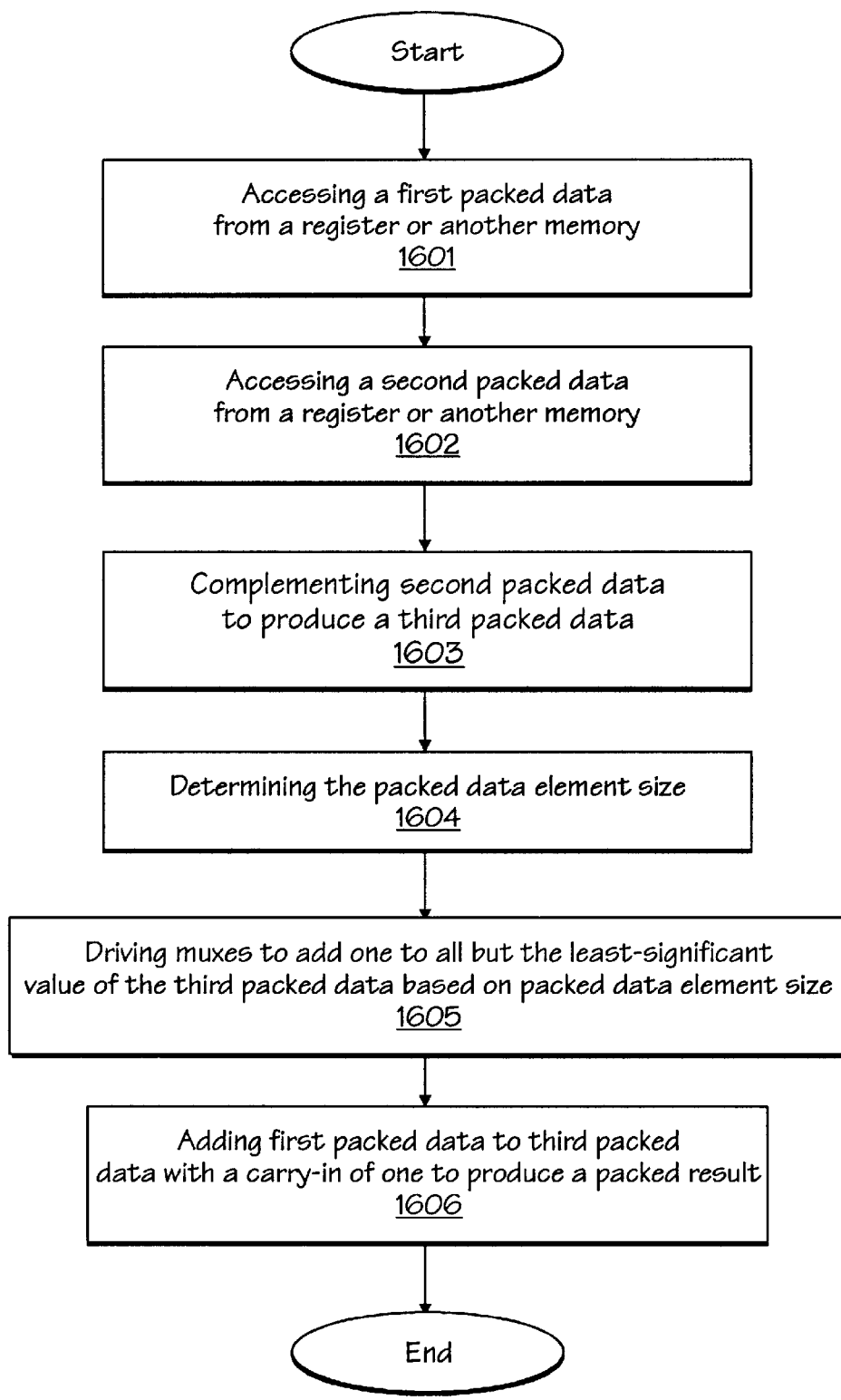
FIG. 16 is a flow graph describing one embodiment of the steps for performing a packed subtract operation.

FIG. 16 illustrates one embodiment of a method to perform a packed subtract operation.

At Step 1601, a first packed data is accessed to from a register or another memory.

At Step 1602, a second packed data is accessed to from a register or another memory.

At Step 1603, the second packed data is complemented to produce a third packed data. The complement of a two's complement value of N is −N−1.

At Step 1604, the packed data element size is determined. The packed data element size may be a byte, word, or doubleword, for example. In one embodiment, the packed data element size is determined based on the control signal 207 (referring to FIG. 2).

At Step 1605, the muxes are driven to add one to each value (except the least significant value) of the third packed data based on the packed data element size determined in Step 1604 according to the methods described above. This operation negates all values (except the least significant value) of the third packed data. The complement plus one of a two's complement value of N is −N.

At Step 1606, the first packed data and the third packed data are added to produce a packed result. The carry-input is one to add one to the least-significant value of the third packed data. Each of the values of the packed result is the corresponding value of the first packed data minus the corresponding value of the second packed data.

Figure 17:
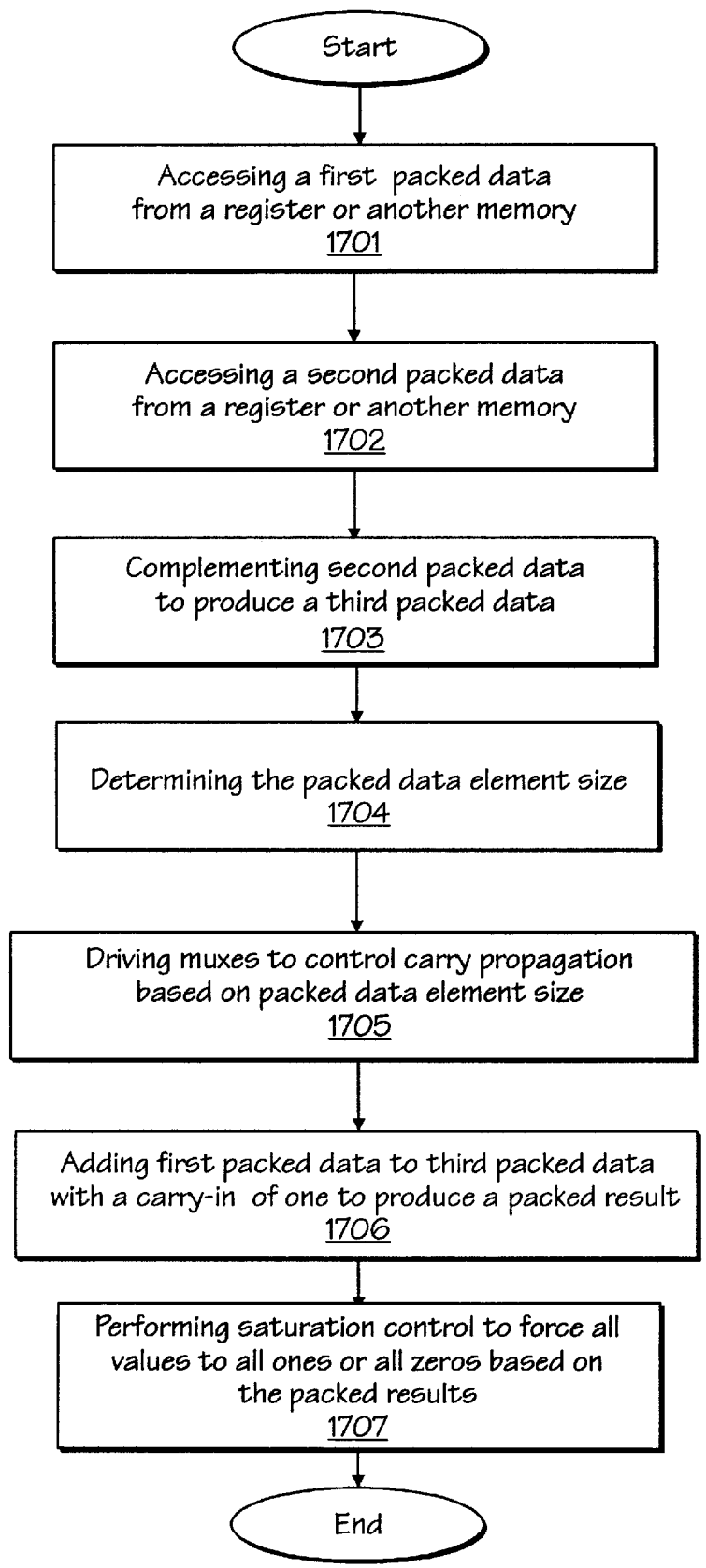
FIG. 17 is a flow graph describing one embodiment of the steps for performing a packed compare greater-than operations.

FIG. 17 illustrates one embodiment of a method to perform a packed compare greater-than operation.

At Step 1701, a first packed data is accessed to from a register or another memory.

At Step 1702, a second packed data is accessed to from a register or another memory.

At Step 1703, the second packed data is complemented to produce a third packed data.

At Step 1704, the packed data element size is determined. The packed data element size may be a byte, word, or doubleword, for example. In one embodiment, the packed data element size is determined based on the control signal 207 (referring to FIG. 2).

At Step 1705, the muxes are driven to propogate the carry of the third packed data based on the packed data element size determined in Step 1604 according to the methods described above.

At Step 1706, the first packed data and the third packed data are added to produce a packed result. The carry-input is zero. Each of the values of the packed result is the corresponding value of the first packed data minus the corresponding value of the second packed data minus one.

At Step 1707, saturation control is performed to force values of the packed result to all ones or all zeroes depending on the packed result according to the methods described above.

Other Embodiments

Thus, an apparatus and method of increasing processor performance by efficiently reducing the difference between data element length and actual carrying and storage capacity has been described. In particular, a processor capable of performing addition and subtraction operations using packed data has been described.

What is claimed is:

1. A microprocessor operable to perform a packed arithmetic operation, said microprocessor comprising:

a first bus operable to have a first packed data comprising a first plurality of packed data elements;

a second bus operable to have a second packed data comprising a second plurality of packed data elements;

a third bus operable to indicate a packed data operation;

a circuit coupled to said first bus, said second bus, and said third bus, said circuit operable to generate at least one pair of bits to control carry propagation depending on said type of packed data operation; and an arithmetic logic coupled to said first bus, said second bus, and said third bus, and coupled to receive said at least one pair of bits, said arithmetic logic operable to generate a third packed data having a third plurality of data elements depending on said packed data operation.

2. The microprocessor of claim 1 wherein said circuit is operable to generate a pair of said at least one pair of bits to have a logic one bit and a logic zero bit to enable carry propagation.

3. The microprocessor of claim 1 wherein said circuit is operable to generate a pair of said at least one pair of bits to correspond to an adjacent pair of bits to enable carry propagation.

4. The microprocessor of claim 1 wherein said circuit is operable to generate a pair of said at least one pair of bits to have two logic zero bits to disable carry propagation.

5. The microprocessor of claim 1 wherein said circuit is operable to generate a pair of said at least one pair of bits to further control whether a one is added to produce at least one of the third plurality of packed data elements.

6. The microprocessor of claim 5 wherein said circuit is operable to generate a pair of said at least one pair of bits to have two logic one bits to cause a one to be added to produce at least one of said third plurality of packed data elements.

7. An apparatus operable to perform a packed arithmetic operation, said apparatus comprising:

a first bus operable to have a first packed data comprising a first plurality of independent packed data elements;

a second bus operable to have a second packed data comprising a second plurality of independent packed data elements;

a third bus operable to indicate a packed data operation;

a circuit coupled to said first bus, said second bus, and said third bus, said circuit operable to generate at least one pair of bits to control carry propagation depending on said packed data operation; and an arithmetic logic coupled to said first bus, said second bus, and said third bus, and coupled to receive said at least one pair of bits, said arithmetic logic configured to generate a third packed data having a third plurality of data elements depending on said packed data operation.

8. The apparatus of claim 7 wherein said circuit is operable to generate a pair of said at least one pair of bits to have a logic one bit and a logic zero bit to enable carry propagation.

9. The apparatus of claim 7 wherein said circuit is operable to generate a pair of said at least one pair of bits to correspond to an adjacent pair of bits to enable carry propagation.

10. The apparatus of claim 7 wherein said circuit is operable to generate a pair of said at least one pair of bits to have two logic zero bits to disable carry propagation.

11. The apparatus of claim 7 wherein said circuit is operable to generate a pair of said at least one pair of bits to further control whether a one is added to produce at least one of said third plurality of packed data elements.

12. The apparatus of claim 11 wherein said circuit is operable to generate a pair of said at least one pair of bits to have two logic one bits to cause a one to be added to produce at least one of said third plurality of packed data elements.

* * * * *

UNITED STATES PATENT AND TRADEMARK OFFICE
CERTIFICATE OF CORRECTION

PATENT NO.    : 5,835,782
DATED         : November 10, 1998
INVENTOR(S)   : Lin et al.

It is certified that error appears in the above-identified patent and that said Letters Patent is hereby corrected as shown below:

Column 4,
Lines 6 and 7, delete "$R_D$" and insert -- $R_0$ --.

Column 7,
Line 55, delete "size".

Column 10,
Line 26, delete "000010002" and insert -- $00010000_2$ --.

Column 11,
Table 4, top row, right-most column, delete "10001000" and insert -- 11111111 --.

Column 13,
Table 5, top row, right-most column, delete "10001000" and insert -- 11111111 --.

Column 18,
Line 29, delete "compact" and insert -- compgt --.

Column 19,
Line 51, after "mux", insert -- 1300 --.
Line 52, after "mux", insert -- 1302 --.

Column 20,
Line 36, delete first occurrence of "1302" and insert -- 1300 --.
Line 46, delete "copgt" and insert -- compgt --.
Line 55, delete "25" and insert -- 23 --.

Signed and Sealed this

Sixteenth Day of September, 2003

JAMES E. ROGAN
*Director of the United States Patent and Trademark Office*